United States Patent [19]

Pahr

[11] Patent Number: 5,294,791
[45] Date of Patent: Mar. 15, 1994

[54] SYSTEM AND A METHOD FOR CONTROLLING POSITION OF A MAGNETIC HEAD RELATIVE TO A SERVO TRACK OF A TAPE BY OPTICAL DETECTION OF AN EDGE OF THE TAPE

[75] Inventor: Per O. Pahr, Lier, Norway
[73] Assignee: Tandberg Data A/S, Oslo, Norway
[21] Appl. No.: 834,856
[22] Filed: Feb. 13, 1992

Related U.S. Application Data

[63] Continuation-in-part of Ser. No. 815,163, Dec. 30, 1991.

[51] Int. Cl.⁵ ............... G01N 21/86; G11B 5/596
[52] U.S. Cl. ...................... 250/548; 250/561; 360/77.03
[58] Field of Search ................... 250/559–561, 250/548, 237 G, 557; 356/384–87, 400; 353/26 A; 360/77.03, 77.12, 77.13, 76, 74.6, 73.13

[56] References Cited

U.S. PATENT DOCUMENTS

| | | | |
|---|---|---|---|
| 4,363,042 | 12/1982 | Kimura et al. | 360/71 |
| 4,395,125 | 7/1983 | Kaneko et al. | 250/548 |
| 4,476,503 | 10/1984 | Solhjell | 360/75 |
| 4,499,383 | 2/1985 | Loose | 250/561 |
| 4,609,959 | 9/1986 | Rudi | 360/106 |
| 4,639,796 | 1/1987 | Solhjell | 360/77.12 |
| 4,662,757 | 5/1987 | Duran, Jr. | 250/561 |
| 4,679,104 | 7/1987 | Dahlerud | 360/78 |
| 4,697,088 | 9/1987 | Bishop | 250/561 |
| 4,731,542 | 3/1988 | Doggett | 250/548 |
| 4,827,140 | 5/1989 | Mohan | 250/548 |
| 4,878,753 | 11/1989 | Nestmeier | 250/561 |
| 4,920,435 | 4/1990 | Yamazaki | 360/77.15 |
| 5,008,765 | 4/1991 | Youngquist | 360/77.12 |
| 5,107,127 | 4/1992 | Stevens | 250/548 |
| 5,120,976 | 6/1992 | Clayton et al. | 250/561 |

FOREIGN PATENT DOCUMENTS

| | | |
|---|---|---|
| 0032660 | 7/1981 | European Pat. Off. . |
| 0390555 | 10/1990 | European Pat. Off. . |
| 2848047 | 5/1979 | Fed. Rep. of Germany . |
| 3347632 | 11/1985 | Fed. Rep. of Germany . |
| 0141609 | 11/1980 | Japan ................ 250/561 |
| 0238402 | 10/1987 | Japan ................ 250/561 |
| 0191003 | 8/1988 | Japan ................ 250/561 |
| 0307304 | 12/1988 | Japan ................ 250/561 |
| 3192512 | 8/1991 | Japan . |
| 2008290 | 5/1979 | United Kingdom . |

OTHER PUBLICATIONS

Mead, et al. "Analog VLSI and Neural Systems" Reading, Mass.: Addison-Wesley Publishing Company, 1989 pp. 257–277, 229–231, 207–209, 96–123.
DeWeerth, et al. "A Two-Dimensional Visual Tracking Array", In: Allen, et al (eds) Advanced Research in VLSI; Proceedings of Fifth MIT Conference. Cambridge. Mass.: MIT Press, Mar. 1988, pp. 259–275.
Lassaro, et al "Winner-Take-All Networks of O(N) Compexity", in Touretzky, (ed): Advances in Neural Information Processing Systems, 1988, pp. 703–711.
Behr, et al, "Technique for Measuring Dynamically the Dimensional Stability of a Flexible Magnetic Storage Disk", IEEE Trans. on Magnetics, Nov. 1981, vol. 17, No. 6. pp. 2748–2750.
Mead et al., "Scanners for visualizing activity of analog VLSI circuitry", Computation and Neural Systems Program, May 23, 1991, pp. 1–25.
OPTEK Technology, Inc., Data Book, 1989, 1990, pp. 1–12, 1–13.
Sharp Corporation Japan, Optoelectronics Data Book, 1988, pp. 24–39 & 52 & 53.
Hardeng, "Measurments on track stability on 9135 tape", Tandberg Data A/S, Sep. 28, 1990, pp. 1–6.

Primary Examiner—Michael Messinger
Attorney, Agent, or Firm—Hill, Steadman & Simpson

[57] ABSTRACT

A method and apparatus performs the detection of an edge of a tape and further controls the read/write head to position itself relative to the detected edge. An array of photodetectors in an integrated circuit chip senses the intensity of light illuminating the chip with the tape running between the light source and the photodetectors. A light-to-dark transition is formed which is indicative of the edge of the tape.

19 Claims, 15 Drawing Sheets

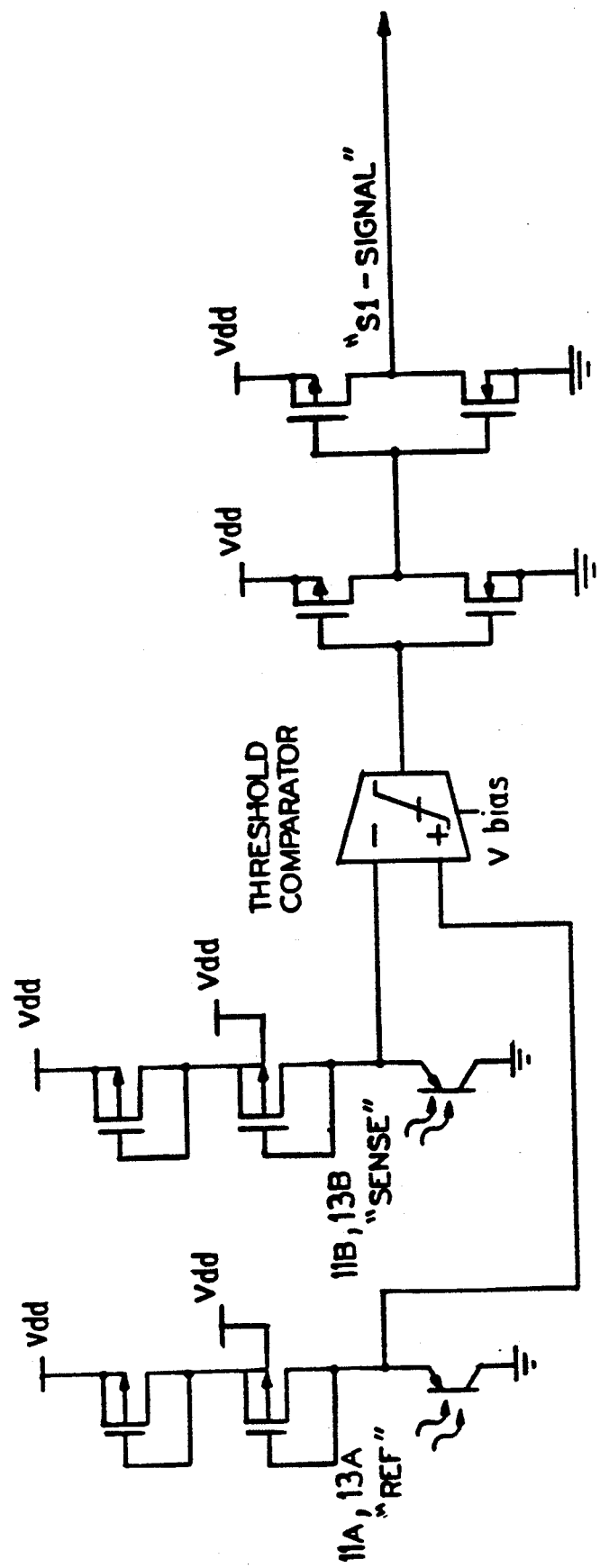

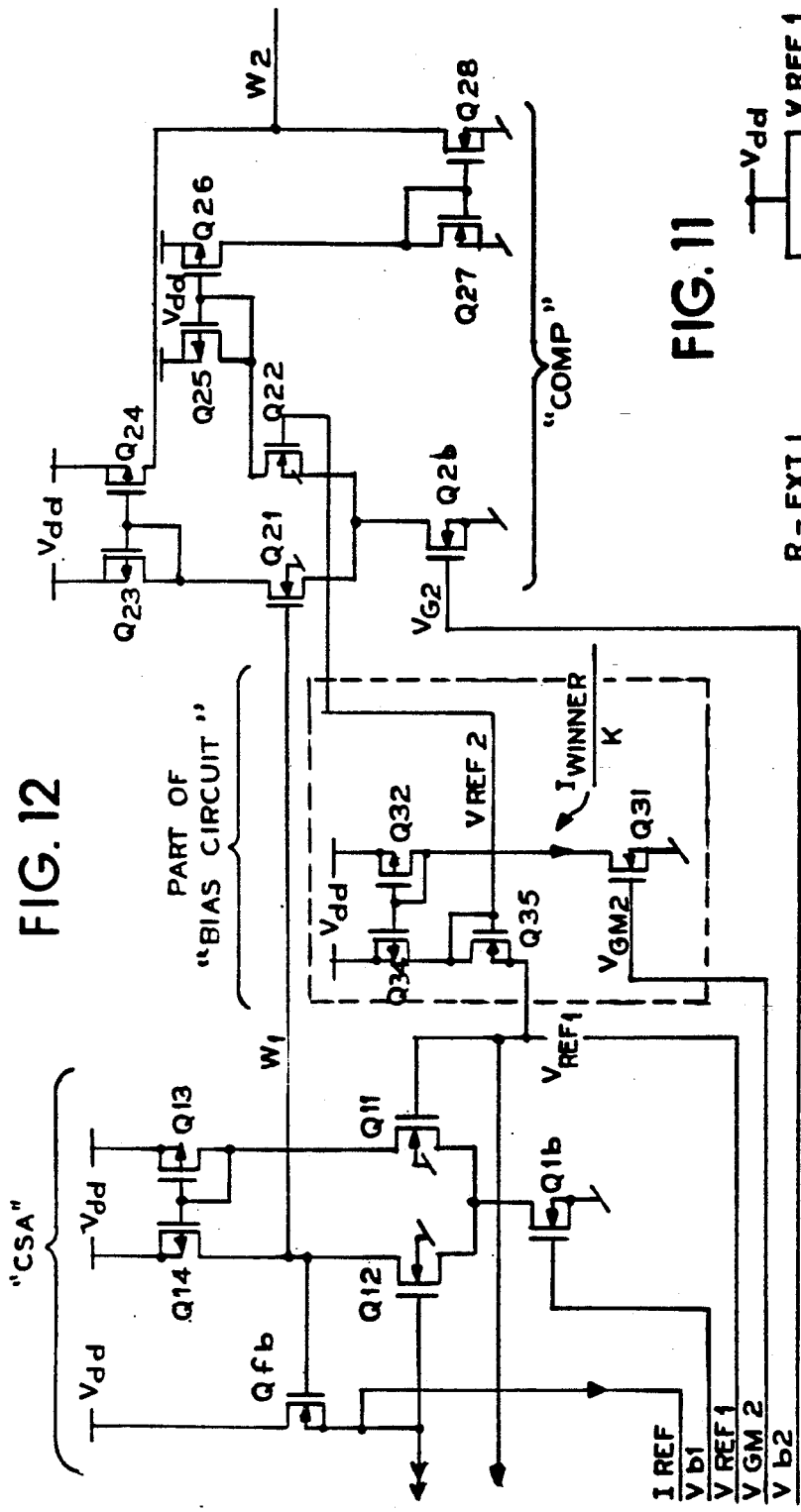

SYSTEM AND A METHOD FOR CONTROLLING POSITION OF A MAGNETIC HEAD RELATIVE TO A SERVO TRACK OF A TAPE BY OPTICAL DETECTION OF AN EDGE OF THE TAPE

RELATED APPLICATIONS

This is a continuation-in-part of co-pending U.S. patent application, Ser. No. 07/815,163, filed Dec. 30, 1991.

BACKGROUND OF THE INVENTION

The invention relates to a system for tracking the edge of a magnetic medium or an optical medium as well as tracking the data thereon.

In high speed magnetic tape reading and writing units ("tape streamers"), the data is read from, or written in, a plurality of data tracks which run parallel to the edges of a magnetic tape. The write/read head of the system must, therefore, be accurately positioned over a selected track to read the data from the selected track or to write new data in the track. It is known, for example, from U.S. Pat. No. 4,476,503 to position the write/read head by first locating an edge of the tape, and then moving the head a specified distance from the edge to the desired track, the tracks being disposed on the tape at respective known distances from the edge.

It is a problem in this technology, however, that in practice the tape will not travel in a constant, perfectly straight path. The tape in moving will meander slightly and will follow an irregular serpentine path. The position of the edge must be constantly monitored with high accuracy and the position of the head is constantly adjusted through a feedback system because data tracks are usually packed so closely together on the tape that a small change in the edge position, in the absence of a corresponding change in the position of the head, can cause the head to be adjacent a track other than the desired track.

Various tracking systems are known in the art for many purposes, such as a transducer which may be positioned relative to a recording tape edge in an optical system. A light transmitter, such as a point source illuminating both the tape and a photo sensor, may be partly covered by the tape and placed in a fixed position relative to the light source and the transducer. The diameter of the photo sensor must be greater than the expected transversal range of movement of the tape. A control system allows the transducer to follow the transversal displacements of the tape.

Another known alternative embodiment implements a fixed position light emitting bar as the light source, and a photo sensor which is rectangular and of the same length as the light emitting bar and fixed to the transducer itself. This embodiment allows for the positioning of a recording head or a transducer relative to the tape edge for a multi-track recording system. Each position requires one reference input to the position controller of the transducer. This allows a signal proportional to the position of the transducer relative to the edge of the tape to be used as an input for the controller, which thereafter sends an error signal proportional to the difference between the reference and the output of the photo sensor to a motor which controls the position of the transducer. There are, however, several drawbacks to such a system. In a first version of the system, the transducer is normally placed between two tape guides and the light beam must be placed between one guide and the transducer itself. The problem is that the drift direction at the position of the light beam and at the position of the transducer can be different. A second version of this system corrects this drift problem; however, since the output from the photosensor is an analog signal, the system is subject to additional problems. The most severe problem is its sensitivity to small dust particles. With a magnetic medium, such particles settle on the illuminated part of the photodiode, and it is difficult to detect the occurrence of and to compensate for such noise. Updating of the DC output from the photodiode each time the transducer is placed in a given position is not possible. In addition, the system is sensitive to stray light pickup unless synchronous detection is used. Similarly, stray light pickup is difficult to compensate for unless the tape drive is completely shielded from external light sources. The use of an infrared source may help, but the stray light pickup is still a problem since infrared light may as well be present as background noise. In a dynamic tracking system, stray light pickup normally contains 100 Hz or 120 Hz components which will disturb a tape edge tracking servo unless synchronous detection is used. If an infrared light source is used, the photodiode may need a filter which is translucent for the wavelength used. This causes the distance from the tape to the photodiode to be increased which in turn reduces the sharpness of the transition zone between the light and dark area of the detector.

Another known method has a magnetic tape passing over a fixed recording/reading head which is automatically balanced in a vertical direction. The nominal vertical position of the tape is determined by at least one set of photo sensors and light emitting diodes and arranged such that the tape edge(s) partially covers the photo sensor(s). A typical arrangement embodies two sets of sensors, one for the lower edge and one for the upper edge of the tape. In this embodiment, the head is adjusted and fixed in a position which corresponds to equal outputs from the two sensors when the tape is placed in its nominal position. A control signal is obtained by simply taking the difference between the outputs from the sensors. The error signal is fed to a motor in a mechanical arrangement capable of adjusting the position of the tape. Such a system is susceptible to the same type of errors as discussed in the above system.

Another embodiment contains two sets of light emitters and receivers very similar to the one described in the preceding paragraph. Problems typical with an analog proportional system, such as difficulties with adjusting and maintaining equal light levels in the two emitters and a circuit for manually balancing or trimming the AC light levels and automatically the DC levels, are still present. The system is inherently susceptible to differences which may occur after the factory adjustments of the light in the two channels; such manual adjustment increases both the production and the component cost of the product.

An automatic track following system is also known which uses at least two separate detecting heads with read gaps wider than the written tracks and where the gaps have azimuth angles of equal values but of opposite rotational sign. During tracking, the centers of the azimuth head follows the centers of the corresponding two signal tracks. When the tracks drift away from the center positions of the azimuth heads, a lead/lag error signal can be extracted from the two heads if the information signal tracks contain some type of known synchronization, e.g. if video sync pulses have been recorded in parallel on both tracks. The polarity of the lead/lag signal determines the direction to move the head, and its value is proportional to the error if the tracks are located within the range of the azimuth gaps. Since auxiliary read gaps are used, responding only to the video sync pulses of long wavelengths, the azimuth angle can be tolerated. The extra tape noise from the unrecorded data can be tolerated in the timing channels due to the lower bandwidth requirement. However, the primary disadvantage of such a system is the inherent weakness of using azimuth heads for tracking, since such allows for a very limited linear tracking range. If tracking is disturbed, the control system has no information available about the direction to move the head. Noise pulses may cause head movement in the wrong direction as well. The head must be moved to the nominal position before the tracking system can be activated after a loss of the lead/lag signal, or a track seeking algorithm must be activated to start recovery. Another disadvantage is the added cost of the extra read heads. Such tracking systems are best suited for helical scan tape formats where the tracking can immediately lock on neighbor tracks if disturbed. Such a disturbance can be tolerated in some consumer analog video tape recorders (single frame loss or disturbance) or in helical scan data storage systems where interleaved data frames and error correction permits the loss of a track.

Another known embodiment proposes a two channel system for data recording where two azimuth read heads are used to derive the tracking error from the time skew between the read data clocks of the channels. The timing pulses are not so easily available as the sync pulses used in other prior art devices. However, this device does not require separate azimuth read heads, since the two write heads also have azimuth angles of opposite sign. The signals are either read back while writing by two aligned read heads with the same azimuth angles, or by the same write heads in simpler tape drives. An advantage of this system is greater information packing density, since no guard bands between tracks in the information area of the tape are needed. This device, however, is limited in the linear tracking range since it requires a very accurate openloop mechanical positioning mechanism in addition to the servo mechanism. An additional problem is the compensation or calibration of the time skew between the channels especially when reading tapes written in other drives. Yet another disadvantage is that if backward compatibility with older tape formats written without azimuth is to be maintained, at least one set of zero-azimuth read and write gaps must be provided. If one of the two write gaps is without an azimuth angle, half of the timing error is present as compared to a double azimuth scheme. The crosstalk from neighbor tracks will also increase.

SUMMARY OF THE INVENTION

It is, therefore, an object of the invention to provide a method for a tracking system with built-in redundance which allows for the continuous monitoring of the tape edges during read signal tracking even if the read gaps are off-track.

It is a further object of the invention to provide a system which stores in memory a history of the positional trace of the tape edges so that tape edge qualification can be performed based on the stored data for the edge.

It is a further object of the invention to provide an integrated CMOS chip to be mounted on the recording head itself or its carriage to obtain increased mechanical accuracy at a lower cost.

It is a further object of the invention to also provide on-chip photosensors for automatic azimuth adjustment of the recording head.

It is a further object of the invention to provide a tape edge detector system that can be made compatible with the proposed QIC standards with dedicated servo tape formats.

Furthermore, it is an object of the invention that the servo system be compatible with data track formats written with other servo systems, such as tape formats using dedicated magnetic servo tracks on pre-formatted cartridges.

The system processes the analog information about the tape edge locally before digitizing the analog data. The analog data is numerically coded before it is sent off-chip to the digital controller and servo.

The tape edge seeking method solves a problem in the art of indicating a false edge position when magnetic particles are torn off from the tape edge due to wear. The wear on the tape edge arises when the number of tape passes exceeds the specified number of passes which are allowed in an environment where the same cartridge is used until it is worn out. The present edge detecting method avoids this problem by detecting an optical edge, not the magnetic edge.

BRIEF DESCRIPTION OF THE DRAWINGS

FIG. 3C is a circuit diagram for azimuth angle sensors.

FIG. 11 is a diagram of the bias circuit which sets up the control voltages for the circuit of FIG. 10 using external resistors.

FIG. 12 is a circuit diagram of a simplified current sense amplifier (CSA) and comparator (COMP) used in accordance with the present invention.

DESCRIPTION OF THE PREFERRED EMBODIMENTS

Figure 1:
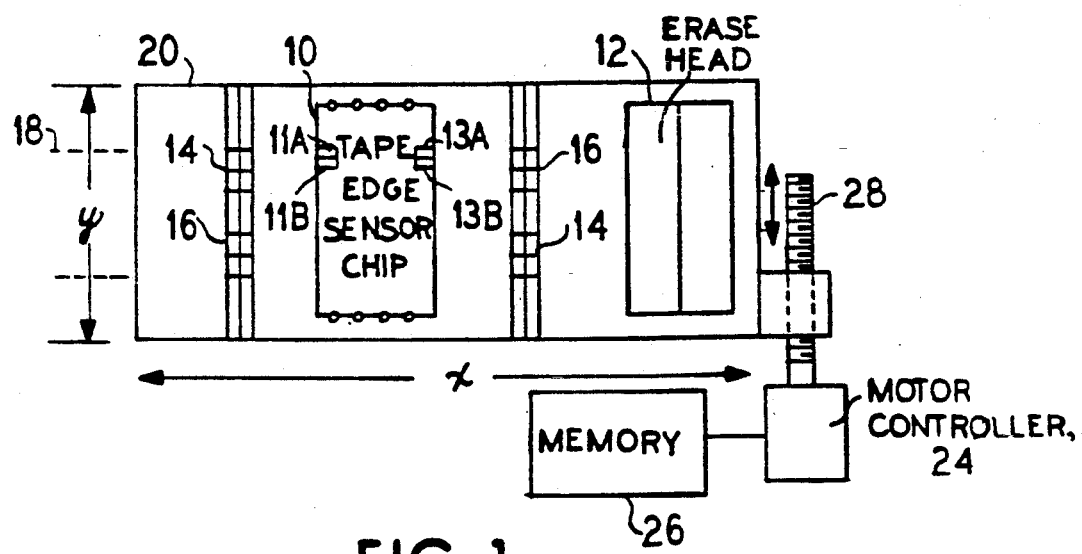
FIG. 1 is a front view of a standard two-channel recording head where the integrated chip according to the instant invention is mounted between the write/read gaps.
Figure 2:
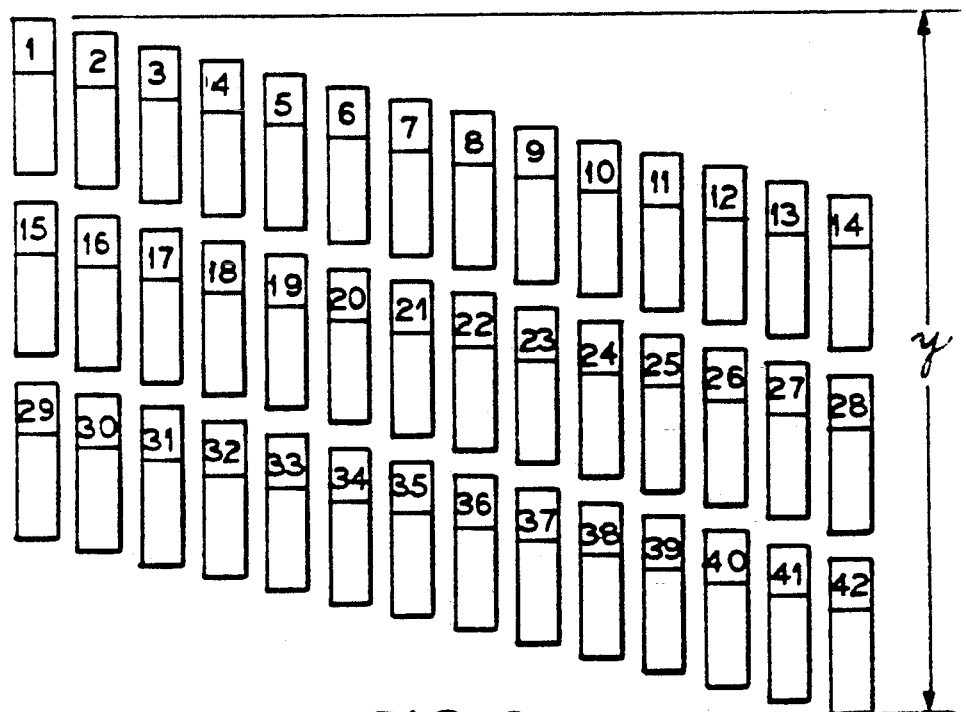
FIG. 2 is an example of a pattern of phototransistors and processing elements located on the surface of the chip in accordance with the present invention.

FIG. 1 shows an integrated CMOS chip 10 mounted on a typical magnetic recording head 20. The active surface of the chip 10 is facing a magnetic tape 18 and is mounted on a magnetic recording head 20 using tape automated bonding technology well known in the art. The active surface of the chip 10 is protected by metal layers and an array of windows is created during the metallization. The windows are numbered from 1 to 42 as shown in FIG. 2. Behind the windows are integrated phototransistors which can be moved perpendicular to the transport direction of the magnetic tape 18. A light source illuminates the tape 18 and the surface of the chip 10 which is not covered by the tape 18. The tape 18 runs in close proximity to the surface of the chip 10 thereby creating a sharply defined boundary between the shadow area and the illuminated area on the active surface of the chip 10. The chip 10 may be mounted in contact with the tape 18 if care is taken to reduce wear by, for example, covering the chip 10 with thick silicon dioxide.

The accurate determination of the position of the tape edge is created by the inherently geometrical accuracy found in the patterns created during the wafer fabrication process for integrated circuits. Dimensions may be controlled to a few parts per million.

One or two index marks, corresponding to known pixel numbers on the detector chip 10, may be aligned with an imaginary center line running between each write and read gap 14, 16 in one or more channels as shown in FIG. 1. The index mark corresponding to known pixel members on the detector chip 10 avoids time-consuming edge-seeking of the edge of the tape 18 since once the pixel numbers of the tape edge have been found, the write/read gaps 14, 16 may also be located.

FIG. 2 shows an example of a pattern of phototransistors laid down in silicon. Other semiconductor materials, such as gallium arsenide, may, as well, be used as is well known in the art. The pattern shown in FIG. 2 can be used for high resolution, one dimensional location of a contrast edge created when the shadow from a recording tape falls on the pattern. The actual, detailed geometrical shape used will depend on several factors including the resolution, light sensitivity, signal processing elements to be used and the actual integration and wiring of these elements together to form macro cells which make up the complete pattern shown. The phototransistors in FIG. 2 partly overlap in the Y-direction of measurement. To enhance resolution, it is possible to increase the overlap between the pixels. This can be done since the raw output signals are analog. Also, photo sensors may be contained within the middle of the processing cells. Other known methods for realizing photo detection may be implemented, such as a charge coupled device (CCD) which is capable of obtaining a greater servo bandwidth.

The raw outputs from the individual pixels are processed in such a way that a smooth intensity profile is created. Based on this profile, the location of the tape edge is estimated. The phototransistors in FIG. 2 are four units in the "Y" direction and the length of the local signal processing part is eight units. Two units are used for wiring space between the cells. The scale of the drawing in the "X"-direction may be varied. Therefore, FIG. 2 does not give a realistic picture of the actual areas required for the processing electronics. The step size between cells, i.e. in the X direction, is one unit in this array. If an ideal contrast edge falls in the center of a phototransistor, the output current from this transistor will be halfway between the "dark" level and the "light" level of its next nearest neighbors. Its nearest neighbors will have output currents corresponding to 25% and 75% of the light difference. With "overlapping" phototransistors, the task of the analog signal processing will be to select the position corresponding to the cell with the 50% level as the best estimate for the edge's position.

Figure 3A:
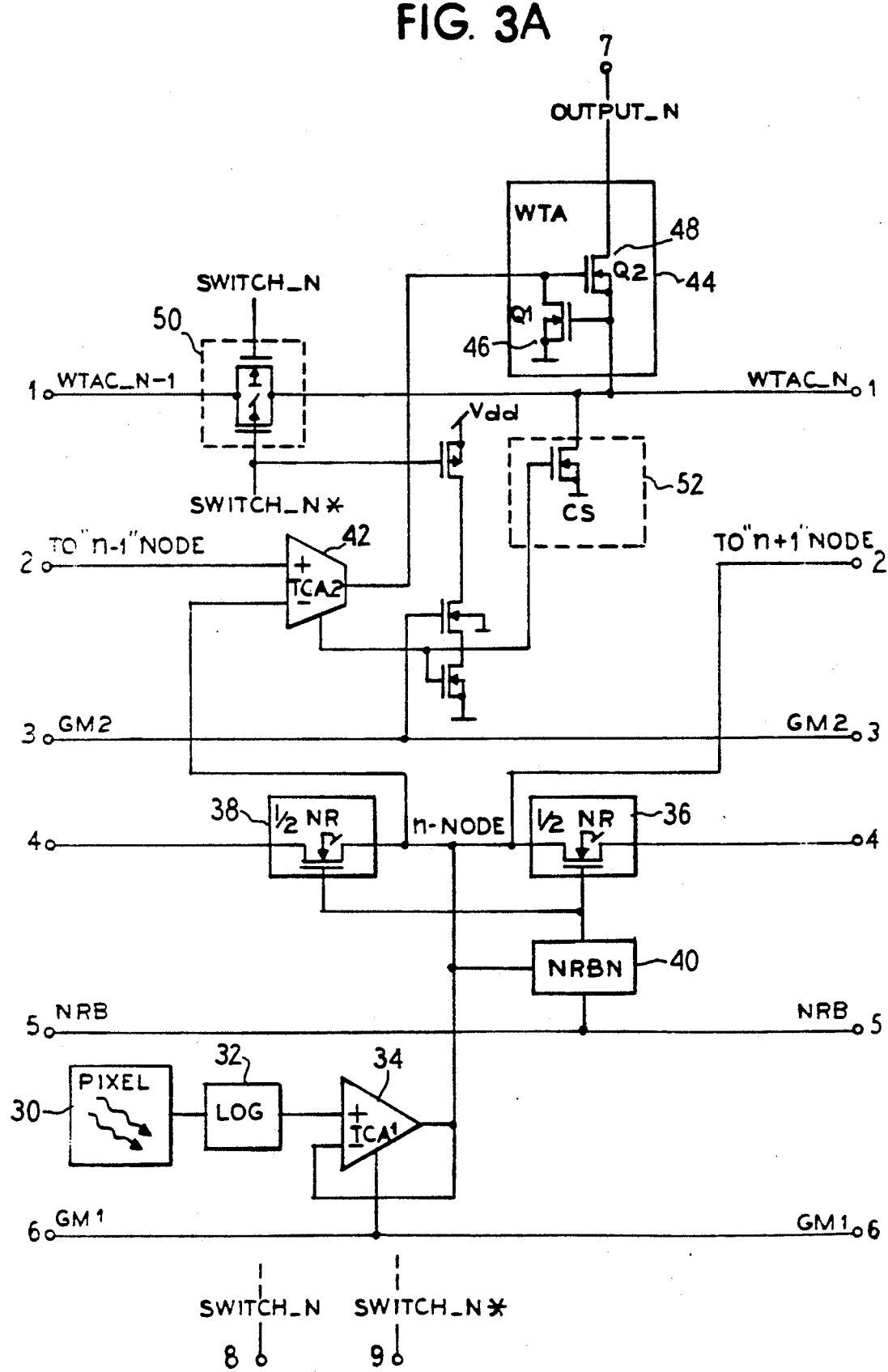
FIG. 3A is a circuit diagram of a first signal processing cell which perform the functions of the instant invention.
Figure 3B:
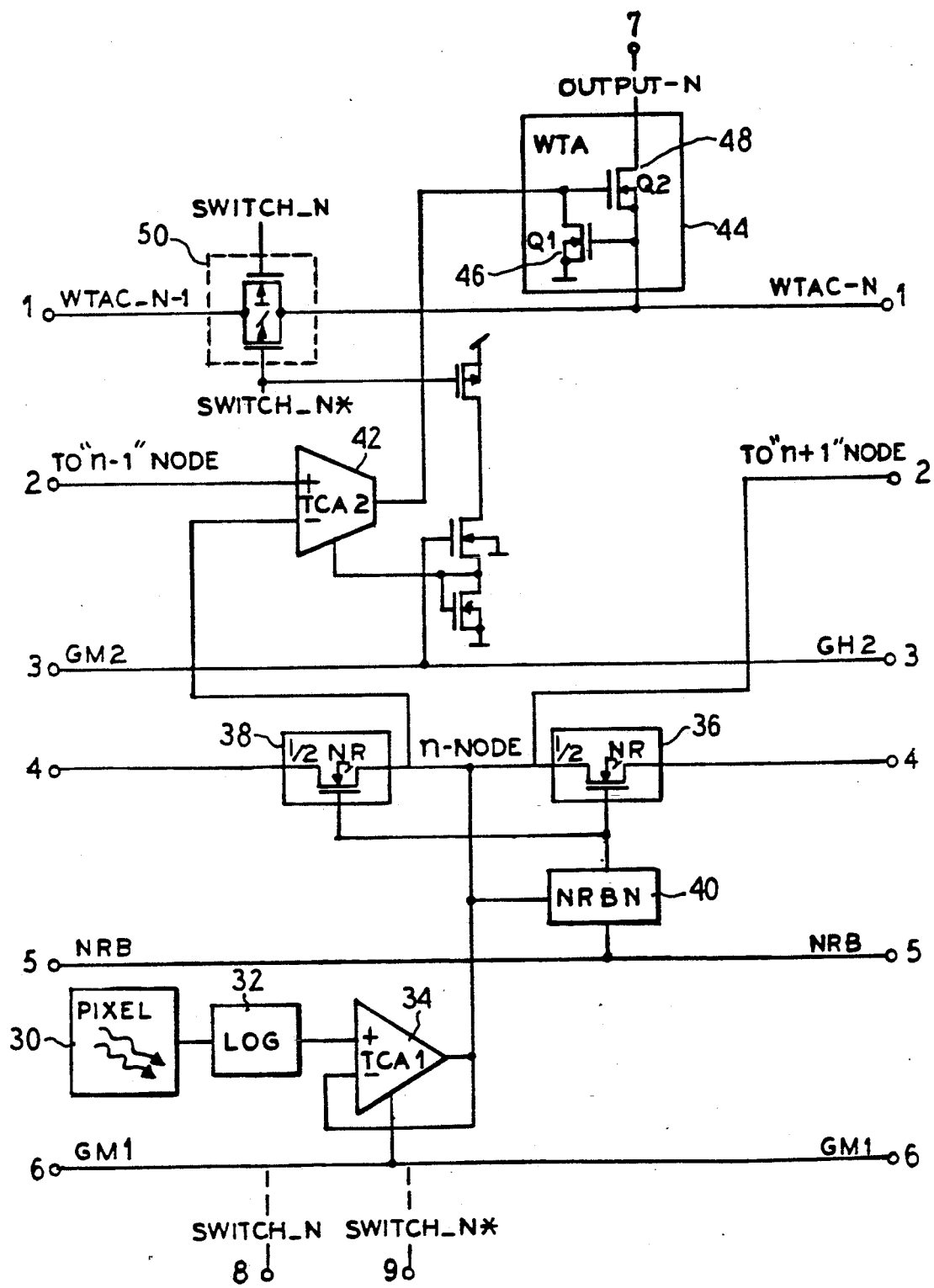
FIG. 3B is a circuit diagram of a second signal processing cell which performs the functions of the instant invention.

The block diagram of the cell shown in FIGS. 3A and 3B performs the basic functions of detection, logarithmic compression, spatial averaging, spatial differentiation, spatial selection of the physical line corresponding to the estimated position of the tape edge and switching in or out of the connections between nodes WTAC N-2 and WTAC N-1. WTAC N refers to the communication line between multiple cells. Each WTAC has active sub-ranges (one range for each tape edge region) where all of the switches are closed. In this way, the time response of the "winner-take-all" can be improved by minimizing the capacitive loading of the communication line. In addition, a transconductance amplifier 42 and a current source 52 which lay outside the active sub-range can be disabled. The use of sub-ranging is important since the information media/magnetic tape typically has index holes to mark the beginning of the tape, the end of the tape, data load points, data termination area and an early warning. Data is automatically rewritten to the tape when it has been lost due to the early warning hole. Therefore, the part of the chip where the holes pass by must be disabled. The WTAC switches, the current sources 52 and its bias switch need only be inserted at regular intervals, e.g. at every fortieth cell. The other type of analog processing cell is as shown in FIG. 3B.

The following description applies to FIGS. 3A and 3B wherein like reference numerals designate like parts. The primary signal current representing the light flux goes from the pixel block 30 to the log block 32 where the logarithm of the current is computed. The numerical value of the computation will depend on the actual semiconductor process used in the area of the transistors. For the calculations presented in this application, a formula of $3.47*\ln(I/IO)$ was used for the voltage normalized to units of $kT/q$. IO is dependent on the process and the area of the transistors and is normally computed for a unit-area transistor. The factor of 3.47 depends on the body-effect. The intermediate signal going to the transconductance amplifier 34 is represented as a voltage. The transconductance, Gm, of the amplifier 34 is controlled by a voltage on the node GM1 which is common to all active cells. The output current from the amplifier 34 drives node "n" to which a nonlinear resistor 36 is connected. The neighbor cell also connects a nonlinear resistor 38 to node "n". The resistances of each nonlinear resistor 36, 38 are controlled by the voltage on the NRB (nonlinear resistor bias) input node. Together with the transconductance of the amplifier 34, the small signal resistances of each nonlinear resistor 36, 38 set the space constant of the network created when multiple cells are connected in series. The space constant is, therefore, controlled by the external voltages applied to the node GM1 and control inputs NRB. Voltage compliance of the non-linear resistors 36, 38 (actually MOS "pass" transistors) is controlled by an automatic bias circuit 40, a nonlinear resistor bias network, which tracks both the voltage and bias developed at node "n" of the cells of the nonlinear resistors 36, 38 so as to compensate for the body-effect of the pass transistors 36, 38. To gain full "neural" advantages regarding the spatial resolution of such a resistor network, the density of nodes should be high and the spatial constant adjusted or should even be adaptable to the desired resolution. The transconductance amplifier 42 is of the "wide-range" type, i.e. its output voltage may be close to the supply rails. Amplifier 42 takes the voltage difference between nodes "n" and "n−1". When the light intensity increases with increasing "n", the incremental current flows out of node "n" if the phototransistors are realized in N-wells. Then the voltage output from the log circuit 32 will decrease logarithmically with an increase in light input. To obtain a positive incremental current out of the amplifier 42 when there is a light intensity gradient in the positive direction, the difference must be taken as shown with the "+" and "−" at the inputs of the amplifier 42. The transconductance of the amplifier 42 is controlled by the voltage on node GM2 which is common for all active cells. This voltage may be switched off when the cell is located outside of the active range.

The final local processing element of the cell is the winner take all circuit 44. It consists of two transistors 46, 48. The input signals to these cells are represented by currents injected by amplifier 42. In this application, the output signals are also represented by currents, commonly named OUTPUT-N, in the cells shown. During the current injection process, the output voltage of the amplifier 42 will rise to an appropriate level given by the DC conductance of transistor 46. If this conductance is too low, the voltage rises at the gate of transistor 48. Transistor 48 will then drive current into the WTAC_N-node. Its voltage rises until the current through transistor 46 is equal to the injected current from the amplifier 42. The injected current is now becoming "the winner". All of the winner take all blocks 44 and the WTAC_N-1/WTAC_N-wires simulate neurons with inhibitory responses, and they share one common signal path to communicate inhibition for all cells. Since the tape edge is always located within a narrow range, the communication distance can be broken up into sub-ranges by controlling the inputs to the switches 50 as shown in FIG. 3A. Depending on the length of the active range monitored, a reference current source 52 is connected to the WTAC_N-line, but only one or a few occur per sub-range. The sub-ranges can be placed freely and symmetrically around the location of the tape where the inputs to the switches come from a long shift register and decoder, and a location of the sub-range depends on the actual pattern loaded into the register. By using sub-ranging, the response time of the system is greatly improved since the capacitive loading by the WTAC-line is minimized. Each cell is able to contribute a current into the node WTAC_N, but only if its input current is larger than, or in extreme cases equal to, other currents. The largest input current will always "win". The signal currents which "lose" are shunted t ground by transistor 46 because the winning current determines the common gate voltage which is communicated to all neurons within the active sub-range. The conductances of the corresponding transistors 46, 48 are so high that very small voltages develop on these nodes. Thus, good suppression of the "losing" signals is due to the exponential relationship between gate voltage and transistor current.

The circuitry of the cell shown here is only able to detect positive intensity gradients. This is an advantage for the application described here since during dynamic tracking of the tape edge, the transition zone from dark to light is known to be within the sub-range. Only a limited number of the switch nodes 50 need be sampled. If a small dust particle is present on the illuminated part of the chip, the first negative transition will be rejected. If the next positive transition is outside the sub-range, it will be suppressed. The same is true for the opposite polarity of transitions in a dual-edge detector described below.

Both tape edges can be monitored to provide redundancy in the system. There is a need to detect both positive and negative intensity gradients. With a serpentine tape format written with a recording head 20 of the type shown in FIG. 1, the center chip can be divided into two halves: one lower half for detection of negative transitions where the polarity of the inputs of each amplifier 42 are as shown in FIG. 3, and one upper half for positive transitions where the inputs of each amplifier 42 are interchanged. Since sub-ranging is used for the WTAC-line, it can be shared for detection of both tape edges having two active ranges. Alternatively, to obtain maximum redundancy in a system, two completely independent systems may be used.

Figure 4:
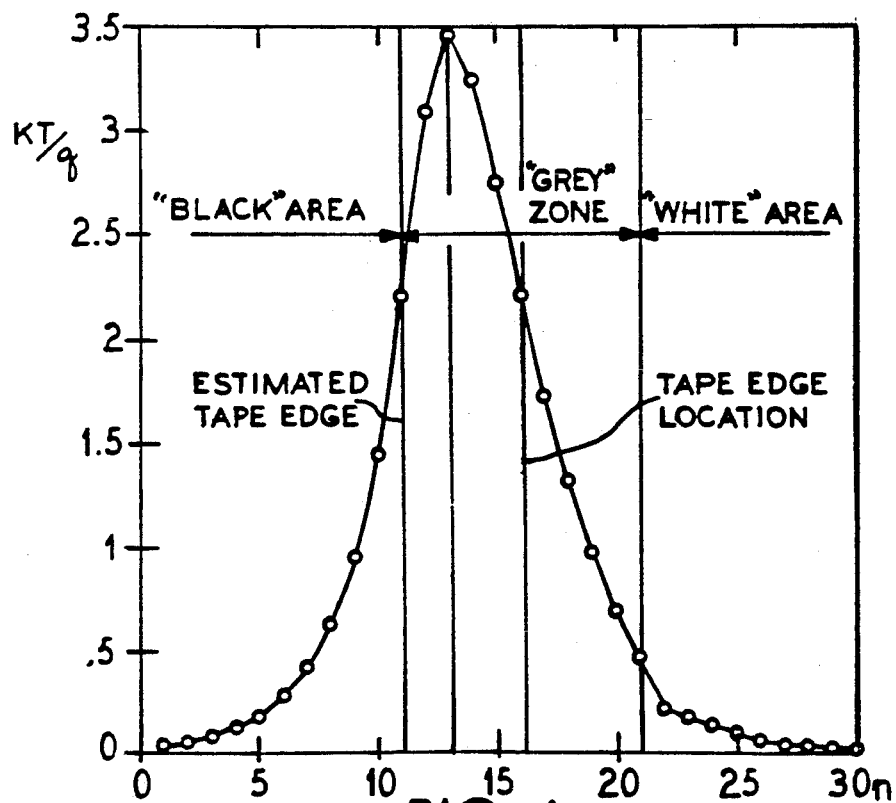
FIG. 4 is a graph of the output of the photodetector cells as shown in FIG. 2.

FIG. 4 shows a processing scheme of the samples logarithmically compressed corresponding to the outputs from the cells in FIG. 2. The raw outputs from the cells are first averaged spatially. To implement this function, a nonlinear resistor network is used. Thereafter, differentiation of the intensity profile I(n) can be defined in this way:

$$dI(n)/dn = I(n+1) - I(n-1)$$

This algorithm gives a maximum of dI(n)/dn for n=13 when the cell n=16 is illuminated by 50% of the "light" minus "dark" level of intensity. Due to weighted spatial averaging prior to differentiation, the signal-to-noise ratio is greatly improved. The final position is selected by comparing in a pure analog manner each output, . . . n−2, n−1, n, n+1, n+2 . . . , of the spatially differentiated pattern resulting in the estimated position shown in FIG. 4. The edge is still estimated at n=13. The signal levels are higher, but the three strongest levels are still close together especially since the signal levels will be inputs to the nonlinear transconductance amplifiers. The transconductance amplifier exhibits a hyperbolic tangent transfer function with a limiting current as the bias current of the input differential stage. This current can be set for sub-threshold operation with an external bias voltage to the gate of the current generator in the differential amplifier. The transconductance amplifier is often used as a voltage follower with a limited and externally controlled output current capability used to duplicate or buffer signals, to drive (nonlinear) resistive networks, or, when loaded with a capacitor, as a temporal integrator.

Another embodiment of the invention uses another differentiation method. The step size between cells is the same as in FIG. 2, that is, one unit.

Figure 5:
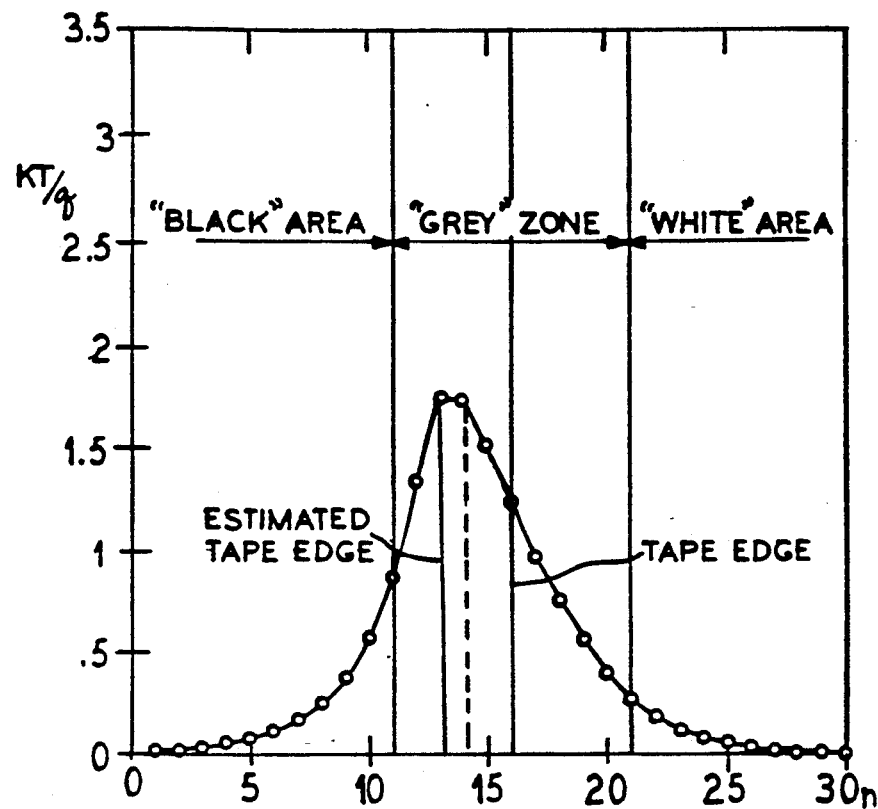
FIG. 5 is a graph of the output of a different pattern of photodetector cells than in FIG. 4.

FIG. 5 shows the signal processing of the four unit phototransistor cell wherein one unit of overlap exists. Differentiation of the intensity I(n) is performed in the following manner:

$$dI(n)/dn = I(n) - I(n-1)$$

The highest output occurs at n=13 with a nearby point n=14. The tape edge is then located at n=16. Hence, an offset exists between the actual physical location and the estimated location.

Figure 10:
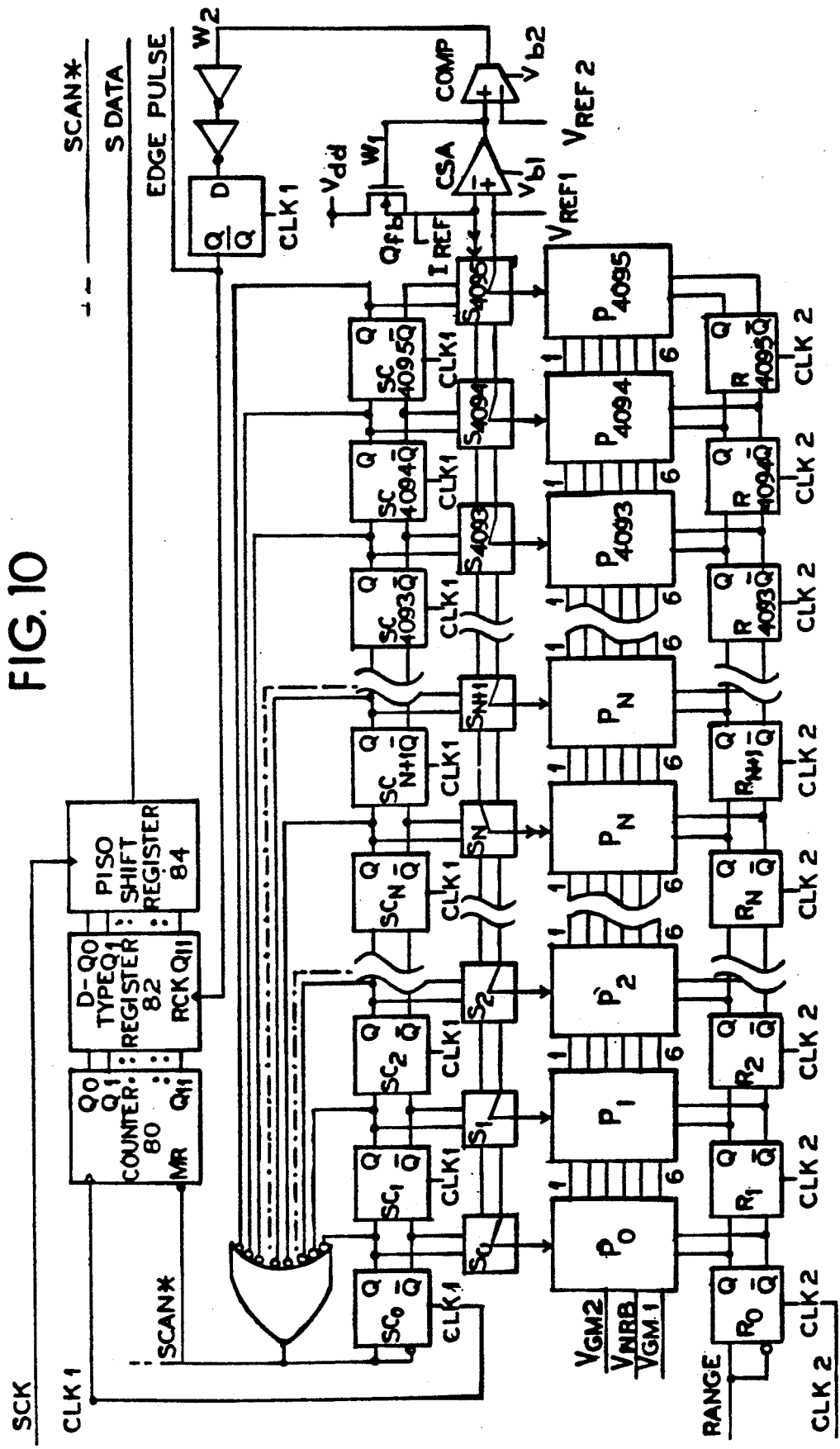
FIG. 10 is a functional diagram of the tape edge detector chip in accordance with the present invention.

In FIG. 10, the analog processing cells have been marked $p_0, p_1, p_2, \ldots p_n, p_{n+1}, \ldots p_{4095}$. The number of cells is equal to the maximum number which can be represented by twelve binary digits. The numbering of the I/O pins of each analog processing cell corresponds to that shown in FIGS. 3A and B. Three global control voltage $V_{GM2}$, $V_{NRB}$ and $V_{GM1}$ are applied to all cells via lines 3, 5 and 6, respectively. These voltages are set up by the bias circuit shown in FIG. 11. They can also be programmed with external resistors indicated by the input pins R_EXT1, R_EXT2, ... as shown in FIG. 11 as inputs to the bias circuit. External analog control voltages may also be applied to the bias circuit, for example to set $V_{NRB}$ which determines the spacial resolution of the pixel averaging network. During power-up and initial start-up procedures to locate the edges of the tape, $V_{GM2}$ can optionally take on a low value to reduce the total power dissipation of the chip when all processing cells are enabled. For this purpose, R_EXT6 together with the control signal HIGH_GM2 have been added as inputs to the bias circuit as shown in FIG. 11.

A row of switches, $S_0, S_1, S_2, \ldots S_N \ldots$ shown next to the row of processing cells in FIG. 10 constitute the analog multiplexer.

The current through pin 7 of cell $P_N$ has a double-arrow indicating this is the current from the winning cell. The switch adjacent $P_N$ routes this current to the upper line which can be accessed by all the switches and to the current sense amplifier, CSA. The current signal is then converted to a voltage signal waveform W1. All other switches dump the losing currents onto a dummy line with a fixed voltage of $V_{REF1}$. Although the winning current is a digitized signal of a known level, the voltage output of the amplifier CSA is compared with a reference voltage $V_{REF2}$ before the signal EDGEPULSE is sent to the counter's D-type register. This is further illustrated in FIG. 12.

The current sense amplifier CSA contains one feature specific to this application, namely an auxiliary weak $I_{REF}$ current which must satisfy the following condition:

$$n*I\text{-lose} < I_{REF} < I\text{-winner,}$$

where n is the number of all losing currents. These currents are not necessarily equal, however, but a sum of currents may be more accurate. Since the losing currents are extremely small and since sub-threshold or weak inversion operation is used, the equation can be easily satisfied. The $I_{REF}$ current provides a defined low-level output of the CSA when the losing currents are sampled. Therefore, the low-to-high voltage level transition can be kept under control and minimized which improves the switching speed. Further, the exponential feedback is used for the CSA meaning logarithmic compression also takes place when the signal is converted from a current to a voltage.

A dual current switching scheme provides a great advantage in that all lines are kept at a constant voltage: the CSA provides a virtual $V_{REF1}$ (plus or minus an input offset voltage) at its negative feedback input node. Charging of the capacitance to ground of the two long lines in the multiplexer is, therefore, avoided, and the analog multiplexer can operate at high speeds. Furthermore, the switching elements themselves are made of complementary pass transistors which minimize the charge injection problem during switching.

The analog switch control shift register operates by means of a single zero which propagates from left to right. At the end of each cycle, the zero disappears to the right, and the global OR-gate generates automatically a new zero which will be clocked into the first flip-flop called $SC_0$ at the next edge of the CLK1 pulse. The output of the OR-gate is shown as SCAN*. This signal also resets the counter 80 as shown in FIG. 10. This is done to synchronize the counter 80 with the scan shift register during the start-up of the system, since the initial state of the scan shift register is unknown at start-up. An asynchronous stop-pulse waveform W2 is generated at the time when pixel N is sampled. This pulse is synchronized by CLK1 and called EDGEPULSE. The 12-bit number for N is converted to serial form by the shift register 84. The SCAN* signal is also provided as an output to an external controller which can synchronize the read-out clock of the shift register 84, SCK, with the operation of the scan register. By doing this, read-out at times when data changes in the D-type register 82 is avoided. When two active sub-ranges are used (duo-edge detection), there must be two samplings per cycle.

Taking the signals SCAN* and EDGEPULSE off-chip is also very useful for testing, monitoring and analyzing purposes. The scanpulse can be used to trigger an oscilloscope, and the position in time of the edge pulse is a map of the location of the tape edges on the chip. When the tape is running and the chip is kept in a fixed position, a time interval analyzer, such as a Hewlett Packard type HP5371A, can be used for statistically analyzing the positions of the pulses. Extracted frequency domain data can then be used for design input to the head servo itself.

The mask layout may require the placing of the counter 80, the D-type register 82 and the shift register 84 off-chip to reduce coupling of digital noise into the low-level analog processing circuits. The noise from the counter 80, the D-type register 82 and the shift register 84 will typically be greater than the noise from the fully differential implementations of the scan register in the analog multiplexer and range select register.

The shift registers, $R_0, R_1, \ldots R_N \ldots$ are range select registers similar in design to the feedback shift register, but they are not clocked continuously. A sequence consisting of 4096 states is set up on the RANGE-line and clocked in by CLK2. Thereafter, the pattern is kept statically in the registers by stopping CLK2. The content of the registers will then consist of ones, followed by a series of zeroes which determines the active range where the tape edge must be present. The rest of the states are filled up by ones if a single sub-range is used or followed by a new pattern of zeroes and ones for dual-edge detection.

Prior to the final sub-range selection, a static tape edge detection (single or dual edge) is performed when all cells take part in a global selection process. In some implementations, the voltage on the GM2 line is reduced during the static mode, i.e. the control signal HIGH_GM2* is inactive.

Sub-ranging is used for high-speed dynamic operation when a tape is moving. Before the final sub-range is selected, the position of the edge must be known to fall within the sub-range or sub-ranges with certainty. Sub-ranging is an option, and its use will depend on the response speed required during dynamic tracking, i.e. on the sampling rate of the tracking servo. However, most often sub-ranging must be used when tape holes disturb the edge detection process.

Another method of improving response speed is digitizing the winning current to a "fixed" level. The level is actually within a narrow range given by offset effects or mismatches between transistors. Therefore, the voltage variations and stray capacitance charging on the communication line, as shown by line 1 in FIGS. 3A and B, between cells will be small when the winning current shifts from cell to cell with time.

FIG. 3A shows the two analog switches with common control signals SWITCH_N and SWITCH_N* can optionally be used. The first is inserted in the winner-take-all communication line to shorten it, enhance, speed up response time by reducing stray capacitance. The second switch is placed in series with the bias input for the amplifier 42 and the gate voltage of the reference current source 52 for the winner-take-all network 44. FIG. 10 illustrates that switch control lines are provided to all of the processing cells although only a sub-set of switches actually needs to be used for the speed-up of the winner-take-all network. The other elements of the range select shift register are used to switch off the inactive amplifiers 42 (shown in FIGS. 3A and B) to save power. Current may be needed in some cases in the upper part of the weak inversion range.

Figure 13:
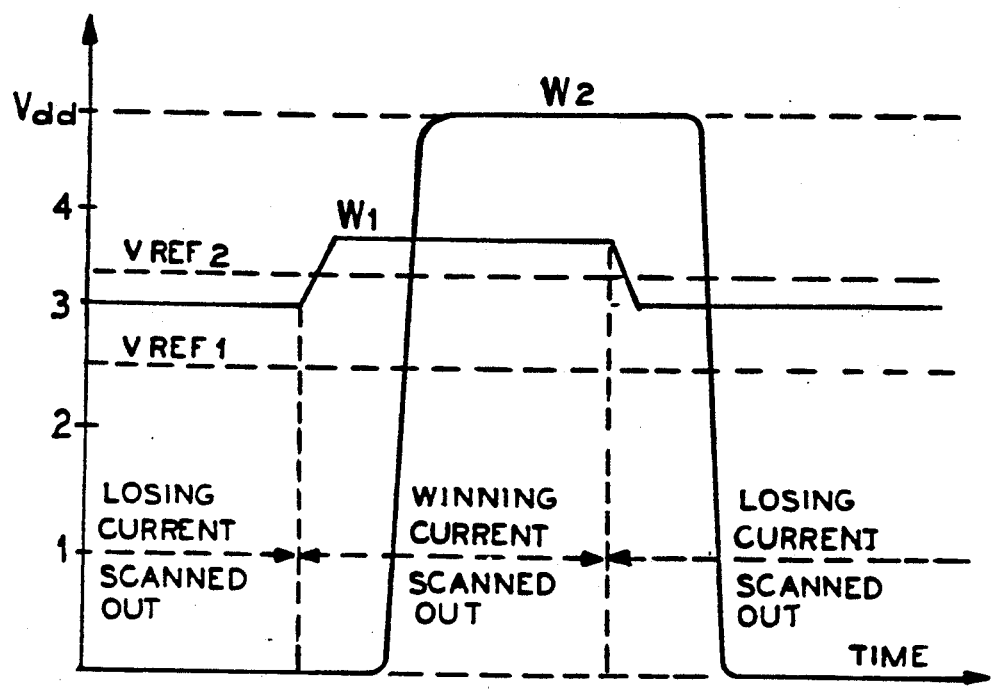
FIG. 13 is a graph of the voltage reference levels and signal waveforms used by the CSA and COMP of FIG. 12.

FIG. 12 shows in more detail the current sense amplifier CSA and COMP blocks of FIG. 10. FIG. 12 also illustrates how voltage $V_{REF2}$ is generated. $V_{REF2}$ comes from the bias circuit as shown in FIG. 11, but its generation has been shown within the dashed lines of FIG. 12 to ease understanding. FIG. 13 shows the voltage levels for the waveforms W1 and W2 of FIGS. 10 and 12.

$V_{REF1}$ may have a value of $V_{dd}/2$. When the losing currents are scanned out, $I_{REF}$ ensures that the output of amplifier CSA, W1, is kept at a well defined level of about 0.5 volts above $V_{REF1}$ as shown in FIG. 13. Since the signal voltage deviation of W1 is small due to the logarithmic compression, the threshold level $V_{REF2}$ of the simplified comparator COMP in FIG. 12 must track $V_{REF1}$. This is accomplished by connecting transistor Q35 to $V_{REF1}$. The voltage which develops over this diode-connected transistor Q35 is also made to be dependent on $V_{GM2}$ which controls the actual magnitude of the winning circuit. Q35 is of the same type as the feedback transistor Qfb. Transistors Q31 and possibly Q32 and Q34 scale the current through Q35 to a certain fraction of the level of the winning current, indicated by $I_{winner}/K$. The threshold level of the comparators may therefore be placed slightly below the high level for signal W1, giving a better overall noise margin.

The comparator COMP is shown as a simple wide-range differential amplifier, i.e. its output waveform W2 goes rail-to-rail, as shown in FIG. 13. Normally, the comparator COMP needs a more complex design than is shown in FIG. 13.

Figure 14:
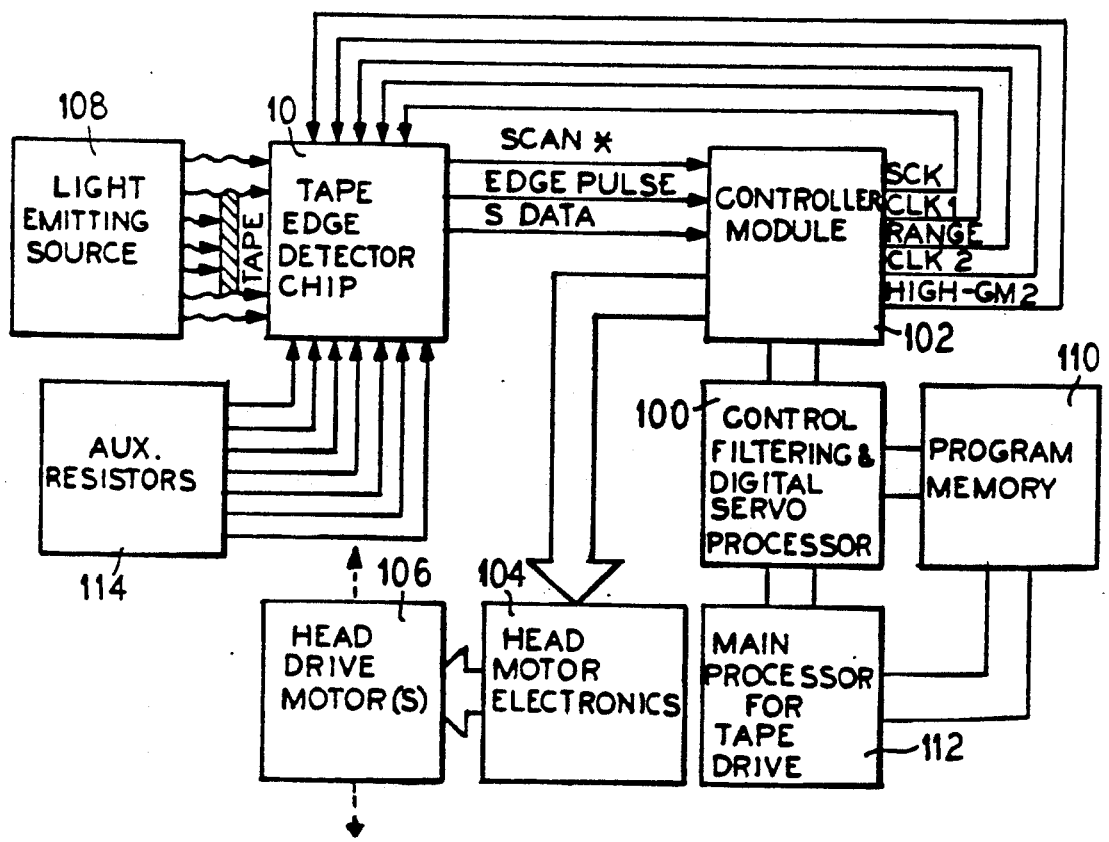
FIG. 14 is a block diagram of the control environment for the tape edge detector chip of the present invention.

FIG. 14 illustrates the control environment for the tape edge detector chip 10. The servo control starts by setting up a reference number in a control, filter and digital servo processor 100. A controller module 102 receives the measured position of the tape edge from a light source 108 projecting light onto the tape which casts a shadow on the tape edge detector chip 10. A SDATA signal indicative of the tape position is sent to the digital servo processor 102 where filtering is performed, and the error is calculated using the program stored in memory 110. The error signal goes back to the controller module 102 which contains the necessary hardware drivers to transmit the error signal to head drive motor electronics 104. In some implementations, the error signal can be transmitted directly from the control, filtering and digital servo processor 100 to the motor electronics 104. In this case, the head drive motor or motors 106 symbolize the transversal movement of the head to correct for the error and the tape edge detector chip 10 measures the actual position of the tape edge which again is read out on the SDATA line by the controller module 102. All other processing functions required for operation of the tape drive are performed by a main processor 112. Auxiliary resistors 114 correspond to the inputs to the bias circuit of the tape edge detector chip 10 shown in FIG. 11.

The physical integrated circuit technology and the methods used to realize the analog signal processing of the present invention are described in "Analog VLSI and Neural Systems" by Carver Mead which is herein incorporated by reference. Conventional digital CMOS VLSI-circuits are based on complementary N- and P-channel MOS transistors which operate above or below a conduction threshold level. The threshold voltage is defined as the gate-to-source voltage where the mobile charges in the channels begin to limit the flow of channel current. For MOS transistors, there exists a certain sub-threshold gate voltage range, i.e. a range of gate-to-source voltages where there is an exponential relationship between the gate voltage and the drain-to-source current. The current in this range is caused by a pure natural diffusion process. For gate voltages approaching the threshold voltage, the exponential increase in the current ceases. The mobile charges in the channel disturb the diffusion process, i.e. they begin to degrade the exponential law. For gate voltages above the threshold voltage, the current increases as the square of the gate voltage. Therefore, the threshold voltage is better thought of as a transition zone between the exponential sub-threshold region and the square-law region.

For a pure exponential relationship between the drain current and the gate voltage, the gate voltage range may be measured between 300 mV to 700 mV. This range may vary somewhat depending upon the actual CMOS process used. In this range, the current increases exponentially over 5 decades from 30 pA to 3 $\mu$A. The transistors will be useful for analog processing in the transition zone and above when the exponential law is not used for computation, when a non-exponential or non-logarithmic limiting effect is desired, or when voltage followers are used for interfacing off-chip signals.

Except for the Early-voltage effect, which can be partly controlled by the length-to-width ratio of the transistors, the drain-to-source current is independent of the drain-to-source voltage if this voltage is greater than a few thermal voltages, kT/q. At this point, the MOS transistor is said to be saturated.

In the sub-threshold range, the MOS transistors behave in a remarkably predictable way. Extremely low power consumption exists with a typical dissipation per transistor in the nW-range. Complete detector chips are possible with the inclusion of integrated photo-detectors among the analog processing elements.

In a CMOS process, the photodetectors can be realized as vertical, bipolar photo-transistors. The bases of the transistors are isolated, diffused wells upon which light is permitted to fall through openings or windows in a metal mask. The emitters are diffused areas in the well, and the common substrate make up the collectors. If the incident photons have energies greater than the bandgap of silicon, electron-hole pairs will be created. For a N-well process, the bases of the transistors are of N-type material. The created base electrons will lower the energy barrier from the emitter to the base and cause an increase in the flow of holes from emitter to collector. For a conventional transistor, there is a large gain associated with this process. The output current from the photo-transistor will be proportional to the intensity of the light.

Logarithmic compression is one of the most powerful analog processing functions which can be realized using the sub-threshold elements. By using logarithmic compression, the log detectors can operate over more than four decades of light intensity, and sensitivity to stray light will be greatly reduced. By taking the difference between the logarithmic output voltage from two pixels, a measure of the contrast ratio which is independent of the actual light intensity levels is obtained.

In the present invention, logarithmic compression is very useful due to variations in light intensities and the simplicity of the implementation. The inherent contrast ratio of the tape medium can be found simply by taking voltage differences. In addition, logarithmic compression may be used with overlapping cells, i.e. the tape edge can be estimated within a fixed offset from the center of the edge.

FIG. 3A, as previously described, shows how logarithmic compression is used. The difference between the logarithms of the "light" and "dark" levels represents the logarithm of the contrast ratio of the "light" and "dark" levels. This number is simply defined as the contrast itself. The contrast can also be defined as the difference between light intensities; however, the relative contrast ratio number used here is independent of the illumination level. Instead, it depends on the translucency of the tape, the reflectivity of the semiconductor surface, its coating, etc. A recording tape is normally manufactured with a specification for a maximum light transmittance of approximately 2% of the incident light.

Figure 6:
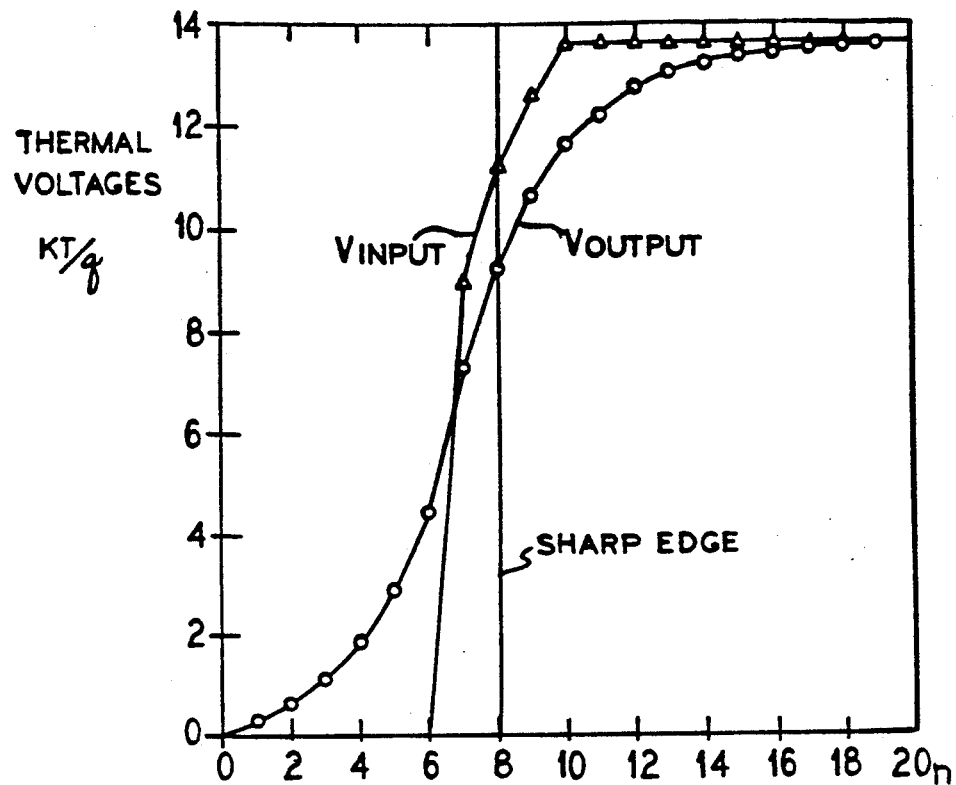
FIG. 6 is a graph of an input signal after logarithmic compression (VINPUT) and then after spatial averaging (VOUTPUT).

FIG. 6 shows two curves, "VINPUT" and "VOUTPUT" computed on the basis of a typical minimum contrast. The axis labelled "n" represents the pixel numbers in the Y-direction in FIG. 2. The Y-axis in FIG. 6 is in units of thermal voltages, i.e. kT/q. "VINPUT" is the signal input directly after logarithmic compression. For n-numbers up to six, the signal level has been chosen as zero. For n greater or equal to 10, the signal level is maximum. The step size between pixels is one-fourth of the width of the pixel as shown in FIG. 2. The "VINPUT" signal will deviate from the ideal one shown here. Such deviations can be considered as noise in the system. The "VOUTPUT" signal, in FIG. 6 shown for a space constant of 2, will be less sensitive to these variations. Therefore, "VOUTPUT" is a spatially filtered version of "VINPUT", and the spatial noise can be partially removed from the input signal.

Figure 7:
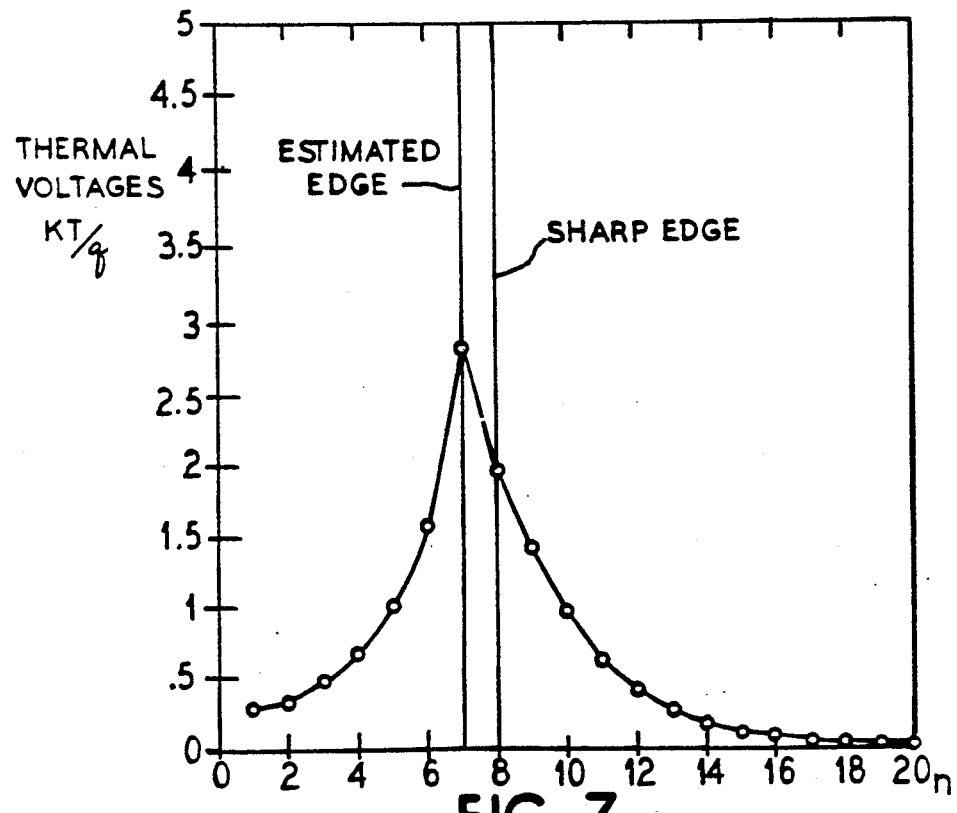
FIG. 7 is a graph of the VOUTPUT curve of FIG. 6 after spatial differentiation.

FIG. 7 shows "VOUTPUT" from FIG. 6 after being spatially differentiated by taking the voltage differences from n-(n−1). The tape edge location has been estimated at n=7, within a distance of nearly one kT/q from the output at n=8. If the differentiation had been performed directly on the "VINPUT" signal in FIG. 6, the distance would have been 8.97 units of kT/q. By reducing the space constant slightly, a distance of, for example, 2 kT/q can easily be obtained. The sample points in the signal in FIG. 7 will be the inputs to a transconductance differential amplifier 42, as shown in FIGS. 3A and 3B. These amplifiers 42 are significantly non-linear if the differential input is greater than a few kT/q.

Figure 8:
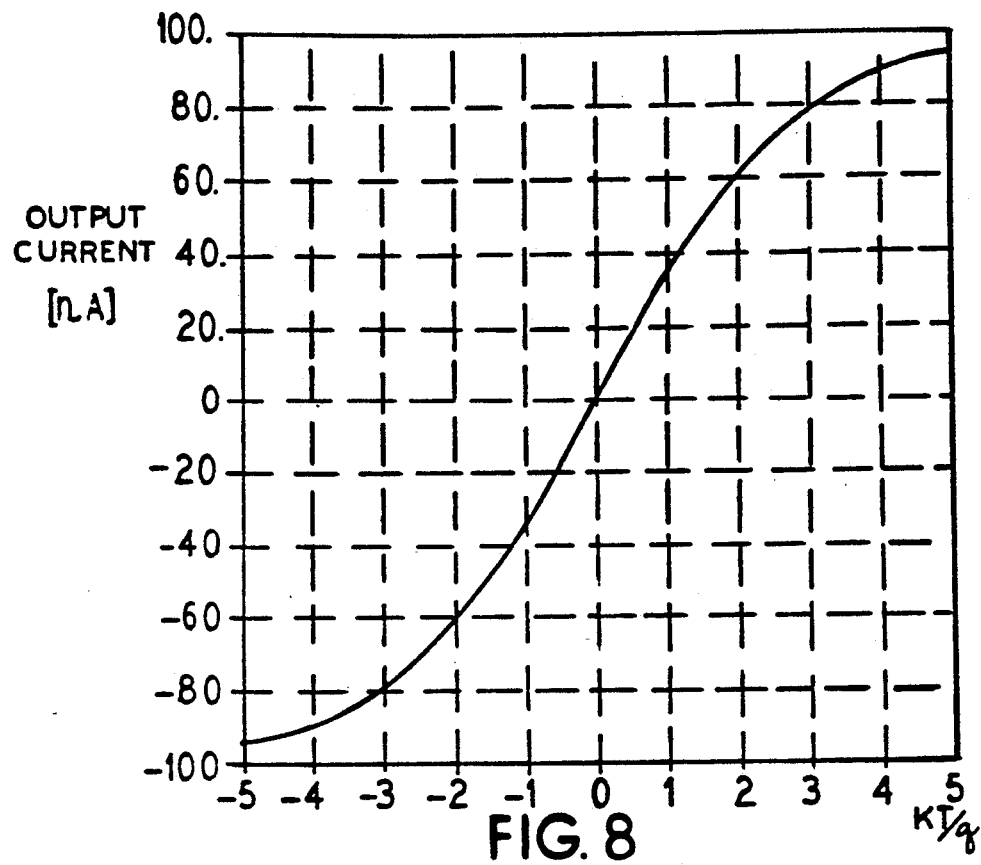
FIG. 8 is a graph of the non-linearity which exists when the inputs to the transconductance amplifier is greater than a few kT/q.

FIG. 8 is an example of such nonlinearity. The actual current output corresponding to the samples in FIG. 7 are strongly compressed if the input exceeds approximately 2 kT/q. The absolute levels of the sample points in FIG. 7 should not be outside the $+/-5kT/q$ input range shown in FIG. 8. The higher the absolute levels of the individual points, the greater the distances must be to separate the points in FIG. 7.

With a sharp transition from "black" to "white", it is possible to obtain a system resolution less than the width of the individual pixels. This is important because in a typical semiconductor process with a minimum drawn gate width of about 1 μm, the design rule for the minimum distance between metal-2 traces specify a window width of 2 μm. In the examples of FIG. 2 and FIG. 6, a resolution of one-fourth the width of the pixel window has been attained. In principle, a resolution of 0.5 μm could be obtained with a 1 μm process, but this will be limited by optical diffraction effects.

Figure 9:
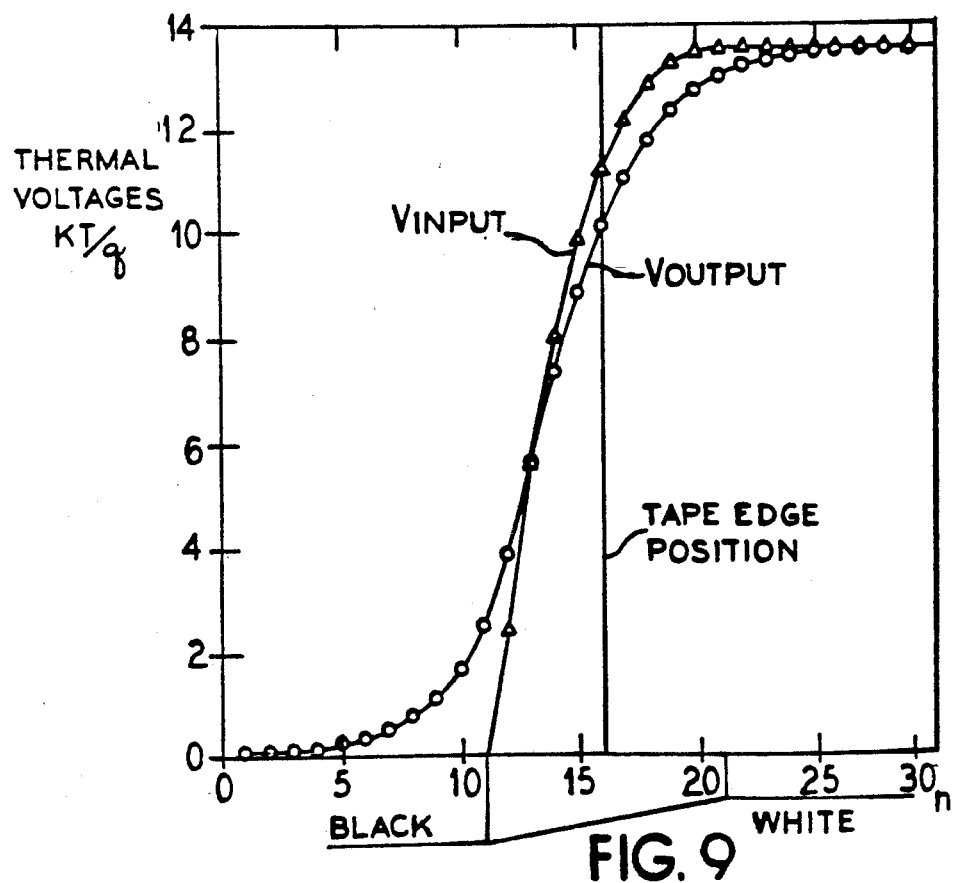
FIG. 9 is a graph showing a transition zone from black to white.

FIG. 9 shows a more practical system in which a transition zone from "black" to "white" levels will always be present. The "VINPUT" and "VOUTPUT" signals when the transition zone goes from n=11 to n=21 is shown in the Figure. The zone was modelled as a linear or "graded" transition from "black" to "white". The width of the zone is 1.5 times the width of one individual pixel sensor, and each pixel is stepped by one-fourth of the cell width. The "VINPUT" graph is therefore the result of integrating the light intensity over all nine pixels located within the transition zone and setting the light input to the other pixels to "black" and "white" levels, respectively. The space constant in FIG. 9 is 2, and the contrast ratio is 50 as was used in FIG. 6.

Spatial averaging, discussed previously, may also be performed using this integrated circuit technology. Inputs from an array of photosensor circuits (pixels) each contribute a current to a node of a resistive network. The actual voltage which develops on the node will be a weighted sum of the inputs to all nodes in the network. The weights decrease geometrically as the distance from the node increases. Such a network has an associated "space constant" and the current drive to each node is limited by the control current set for the transconductance amplifiers. Therefore, a smooth average, resistant to spuriously bad inputs, is computed.

The realization of a network of very high resistance in a standard CMOS process can be done with a so-called "horizontal resistor" which is not a resistor in the usual sense, but two MOS pass-transistors where the channel resistance can be controlled electronically. These "resistors" operate in the sub-threshold range. A very useful property of the horizontal resistor is that the current versus voltage graph is non-linear and follows a hyperbolic tangent function. The current saturates for input voltages greater than about 150 mV. For this reason, it is possible to compute smooth, error resistant averages and also to obtain segmentation. Both the transconductance amplifiers driving the network and the horizontal resistors themselves will saturate when the input voltages exceed a few kT/q thermal voltages. When a contrast boundary is present in the one-dimensional "picture" input to the photoreceptors, the computed node voltages on the horizontal resistive network will reproduce this contrast and segments the image into smooth areas.

FIG. 1, in addition, shows a conventional control apparatus to position the edges of the magnetic medium or the data track itself using the dynamic position information for the magnetic recording head that is processed locally in analog form without the need for digitizing the input. The control of the position of the write/read heads 14, 16 is performed by a system as disclosed in U.S. Pat. No. 4,679,104 which is herein incorporated by reference. During the write operation, the write/read heads 14, 16 track either one tape edge or an average position determined by both edges. For some tape formats, the lower edge can be used for one-half of the tracks and the upper edge for the other half of the tracks. This is useful in reducing temperature dependent variations in track positions. Based on the actual tape width found and the actual tape format in use, the track positions are calculated so that guard bands of equal width are created at both tape edges. The actual positions for each track are stored in a write table, shown as memory 26. If a read-while-write head is used, the read gap lies in-line with the write gap and it will automatically follow the movements of the head which is under servo control.

During the read mode, the initial procedure is slightly different from the write procedure in that the exact or optimum position for the head may be determined by reference bursts placed prior to the beginning of the data tracks for each recording direction on the tape 18. Therefore, the tolerance offset between the write gap and the read gap may be eliminated. Using the reference burst procedure modified for servo control, the head is positioned below the nominal positions of the reference burst, and a read operation is started under tape edge servo control. The read signal is passed through a band pass filter with a center frequency corresponding to the expected frequency from the reference burst. The head is then moved upwards under servo control until a threshold detector signals that the read gap is over the lower part of the reference burst. The positional number for the head is stored in memory 26. Then, the read gap is moved well above the reference burst, and the head is moved downwards until the threshold detector signals that the upper part of the reference burst has been found. A positional number for the reference burst center line is then calculated. This center line will coincide with a center line through the corresponding data track. A typical system will then correct all of the numbers in the track table used for write operation and create a new read table. In the current serpentine track formats in use, many reference bursts are provided. The number of reference track alignments to use will depend on the actual accuracy which was used during writing, i.e. the tape edge detector chip 10 and tracking servo system must also read tapes written by other competing systems. In a quality tape drive, it is only necessary to read two reference bursts, one for each recording channel, i.e. recording direction, forward or backward.

When the detector chip 10 has been set up to work in the static mode and the positions of the edges are known at the beginning of the tape, one can either start to write data in the dynamic tracking mode or can perform a new tape qualification procedure. This is required since the tape edges may have been damaged during extensive use of the cartridge or there may exist production defects on the tape. Tape edge defects indicate that the cartridge should not be used for high reliability storage of data. Two different operations can be performed to determine the qualification of the tape before writing data: a "track repeatability test" and a "tape defect test."

The track repeatability test checks the specified dynamic transverse tape track movement variation. For a 0.250-inch tape cartridge, this is typically specified as +/−0.013 mm for the first write pass after tape conditioning. The variation in the opposite direction should not exceed +/−0.025 mm. The tape edge servo is disabled, and the tape is conditioned by running it from the beginning of the tape to the end of the tape, and back again to the beginning of the tape. Then, the tape is run in the forward direction. The position of both edges are monitored and stored in memory as a variable length data array. A spatial low pass filtering operation is performed by the servo processor 100, shown in FIG. 14. The result is again stored in memory and the raw data is discarded. The low pass filtering on the data may be performed when the tape is running by including a digital hardware filter (not shown) in the servo processor or by implementing the filter in the firm-ware. The mean value of the two one-dimensional arrays are computed and stored in memory. This mean-value array represents the wander of the center line of the tape and the data tracks to be written. The deviation is computed between the measured center line and a "best fit" line through the same center line. If this deviation corresponding to a distance greater than the maximum allowed value, the qualification process may be stopped, and a signal indicative of faulty transverse tape movement in the forward direction may be indicated. The tape is then run in the reverse direction, repeating the same procedure and using the actual specification limit.

The tape defect test provides duo-edge detection in which a first defect test pass follows the upper edge of the tape only, and the program module examines the lower edge for defects. On a succeeding pass, the servo follows the lower edge, and the program module examines the upper edge for defects. The firmware module keeps track of the tape position by counting the number of pulses from the capstan motor.

The method of the tape defect test is performed as follows: the tape speed is reduced well below the normal operating speed to allow for a proper spatial sampling of the possible edge defects. Raw data points are passed through a band-pass filter in the control, filtering and digital servo processor 100, as shown in FIG. 14. A threshold detector function follows the band-pass filter. The band-pass filter may be a combined low-pass one with a high cut-off frequency and a high-pass one with a low cut-off frequency. The low-pass function is needed to remove spurious noise in single data points, and the high pass function is used to remove the low-frequency content, i.e. the running average value of the tape edge position. If the tracks repeatability test is run first, the running average value for the tape edge position is computed and is stored in memory and that can then be used to remove the average value when searching for defects. This is done with high accuracy since measurements have shown that transversal movements of the tape tend to be reproducible if the tape has been properly reconditioned before the test starts.

When a filtered signal exceeds a certain threshold, the signal is stored in memory together with the tape position. The defect storing routine also has both "pre-trig" and "post-trig" functions, so that a certain number of data points are stored both prior to the trig-in and after the trig-out points from the threshold detector. The defect data can then later be transmitted off-drive for external analyses or human inspection.

The method may also be performed by stopping the tape drive and rewinding the tape slowly to the actual position where the defect occurred so that the defect is positioned just in front of the magnetic recording head. The user can then remove the tape cartridge from the drive and inspect the tape manually and decide if the defect is so severe that the tape must be discarded.

In addition to the tape edge tracking servo discussed above, automatic adjustment of the recording head may be performed by monitoring the azimuth angle. The azimuth angle, as is known in the art, is the deviation formed from an imaginary center line through and parallel to the write and read gaps and normal to the edge of the tape. Ideally, this angle is 0°, or it can be set at a different angle if azimuth recording is intentionally used to reduce cross-coupling between tracks. This automatic adjustment is performed by placing two additional, stand alone photosensors 11, 13 as shown in FIG. 1 at the upper edge of the tape 18 and inside the outer edges of the tape edge sensor chip 10. An imaginary line running between the two sensors 11, 13 corresponds to one edge of the tape 18, the upper edge as shown in FIG. 1. The sensitive areas of sensors 11, 13 is very small such that uniform light intensity is present within two local regions. Each region contains two light sensitive elements, 11A, 11B and 13A, 13B. The distance between the two sensors 11, 13 is designated by "1" in FIG. 16. The outputs from 11A, 11B and 13A, 13B are compared independently by local threshold differential amplifiers included on the tape edge detector chip 10.

The outputs of sensors 11A, 11B and 13A, 13B are provided to a circuit as shown in FIG. 3C. Floating gate techniques may be used to correct for the total, effective offset between the "REF" and "SENSE" elements in sensors 11, 13 when they are illuminated with constant light density during the testing process of the detector chip itself.

The azimuth adjustment is performed by inserting a tape parallel to the reference plane of the cartridge (within small tolerances). The magnetic head 20 is mounted within a tolerance which is later fine tuned.

Figure 15:
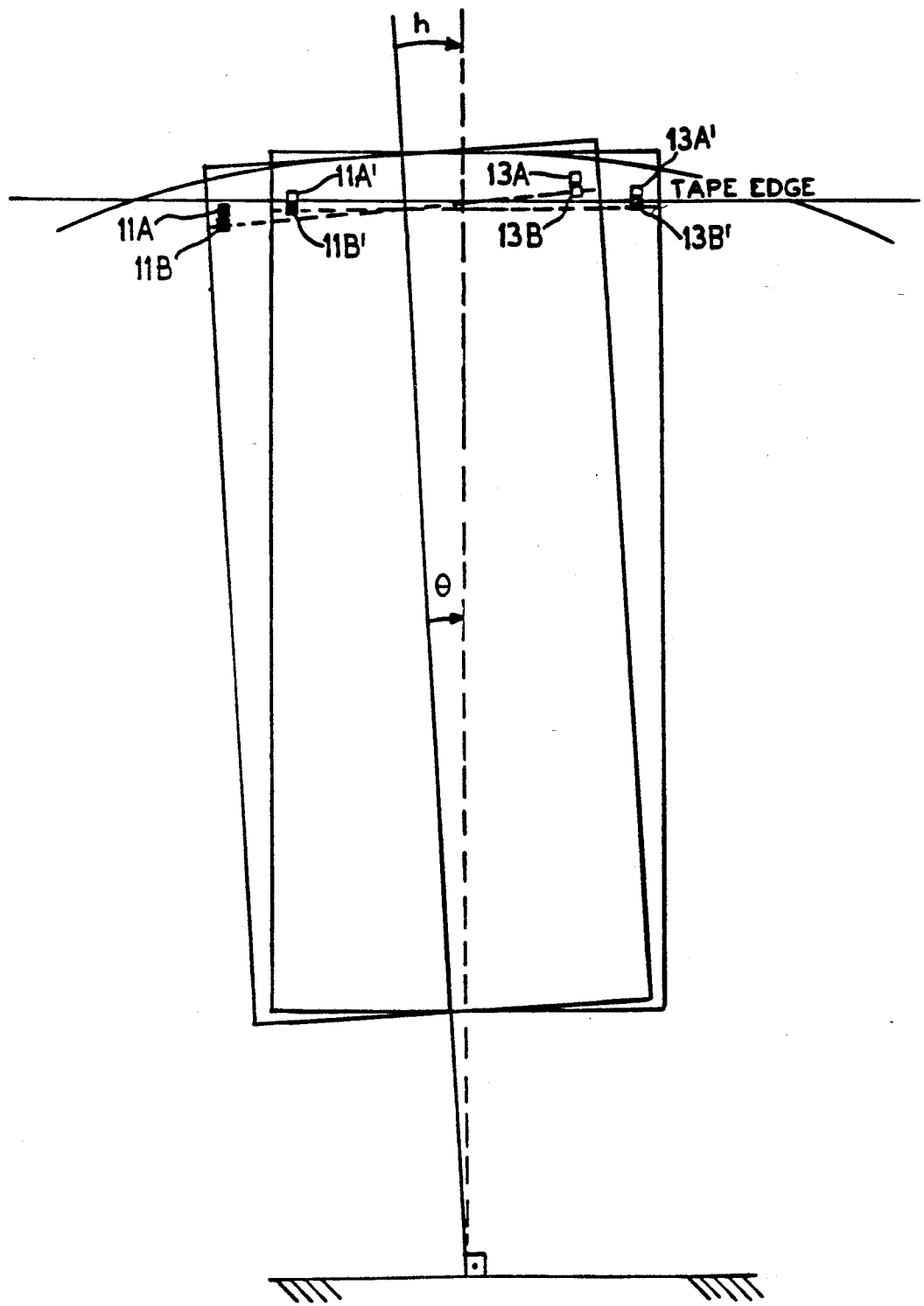
FIG. 15 is a diagram of tape adjustment for small azimuth offset.
Figure 16:
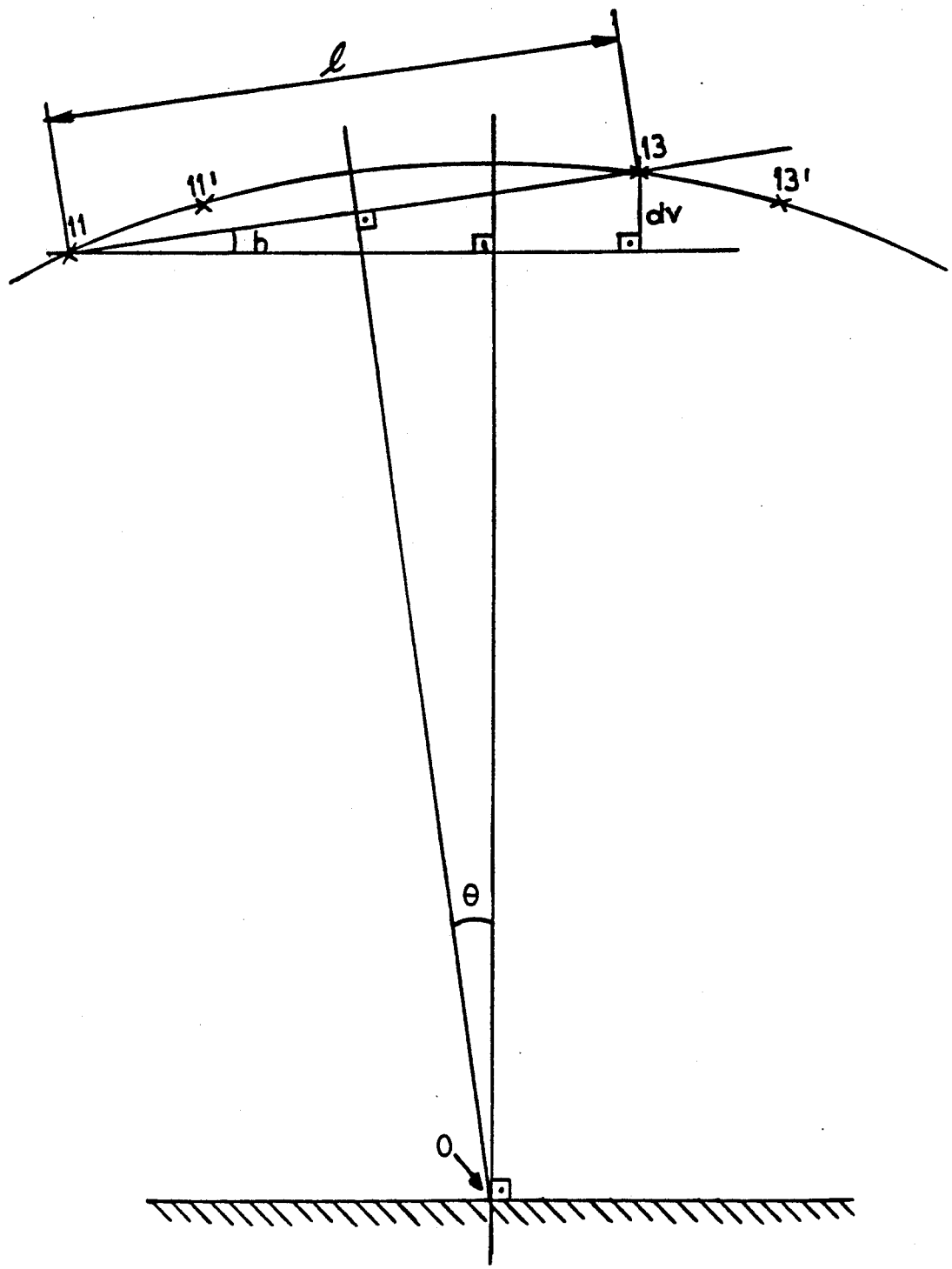
FIG. 16 is a diagram of tape adjustment for larger azimuth offset than that shown in FIG. 15.

To avoid the tape 18 sticking to the head 20 when the head 20 is moved, the tape 18 may be moved back and forth during an adjustment procedure. The magnetic head 20 and the detector chip 10 are moved upwards (or downwards if sensors 11, 13 are positioned for the lower edge) so that both sensors 11, 13 are illuminated causing logical "high" outputs from both sensors 11, 13. The offset voltage built into the differential amplifier or threshold comparator in FIG. 3C is of a polarity which ensures that the output is "high" when the input voltages from the "REF" and "SENSE" phototransistors are equal or within an offset voltage. Therefore, the output from the detector circuit in FIG. 3C is "high" when both the "REF" 11A, 13A and "SENSE" 11B, 13B elements are illuminated, either with "light" or "black" intensities. Then the head 20 is moved downwards until one (or both, if the azimuth angle is incidentally near 0) output goes "low". Such an embodiment is shown in FIG. 15 where the output from elements 11A, 11B are at "black" levels because the sensor was moved too great of a distance downwards. The head 20 is now moved upwards again until 11A is illuminated and 11B is in the shadow. The output from sensor 11 will then be "low". Hence, a "low" signal is provided by the circuit in FIG. 3C only when the tape edge lies between the "REF" 11A, 13A and "SENSE" 11B, 13B elements. When the head 20 and the detector chip 10 are rotated an angle $\theta$, the sensors 11, 13 are at positions 11' and 13', as shown in FIG. 15, both having "low" output signals. If the initial azimuth error is large or the geometrical distance "1" between the sensors 11, 13 is large, the outputs from the sensors 11, 13 may also both be "high" during the rotation as shown in FIG. 16. If the center of rotation "O" is placed as shown in FIG. 16, i.e. if the nominal positions of sensors 11, 13 are placed symmetrical with respect to the line through "O" perpendicular to the reference plane, then the head 20 may be rotated to an azimuth angle of opposite sign and stop when the sensor 13 goes "low". The total angle is measured during this procedure, and the head 20 is rotated back again to the first position or beyond taking care of any hysteresis, if necessary. Then, a new rotation is started with the known half-angle calculated by the azimuth control system.

Another embodiment allows for a stepper motor 24 to move the head 20 upward so that the tape edge follows the sensor 11 and causes its output to go "low". This tracking is continued until the sensor 13 goes "low".

In FIG. 16, the following distances were used in calculation. The distance between sensors 11, 13 is $l = 2.5$ mm. An azimuth angle of 2.9 mrad is used, and a delta vertical, dv, of 7.25 $\mu$m results. The azimuth detector therefore is required to have a resolution better than dv. A standard, digital CMOS process of current technology defining openings of 3 $\mu$m by 3 $\mu$m is possible.

In another embodiment, the edge detector system can be made compatible with the proposed QIC standards with dedicated servo tape formats as well as data track formats written with other servo systems, such as tape formats using dedicated magnetic servo tracks on preformatted cartridges, e.g. QIC 6000, 6 GByte, and 10.5 GByte, both proposed QIC standards.

The edge detector system uses two channels since no servo write head is required. The mechanical accuracies of the track locations are set indirectly using a feedback system where the accurate reference input comes from a photosensor pattern on the tape edge detector chip. A programmable tape hole detector on the chip can use the same photosensors as the tape edge detector.

The read-while-write head, however, must be made with three channels to be compatible with certain dedicated servo formats since some formats use two different physical distances between parallel recorded tracks. However, no special servo write head is needed to be compatible since servo preformatted tapes can be bought when tape interchange is needed.

Figure 17:
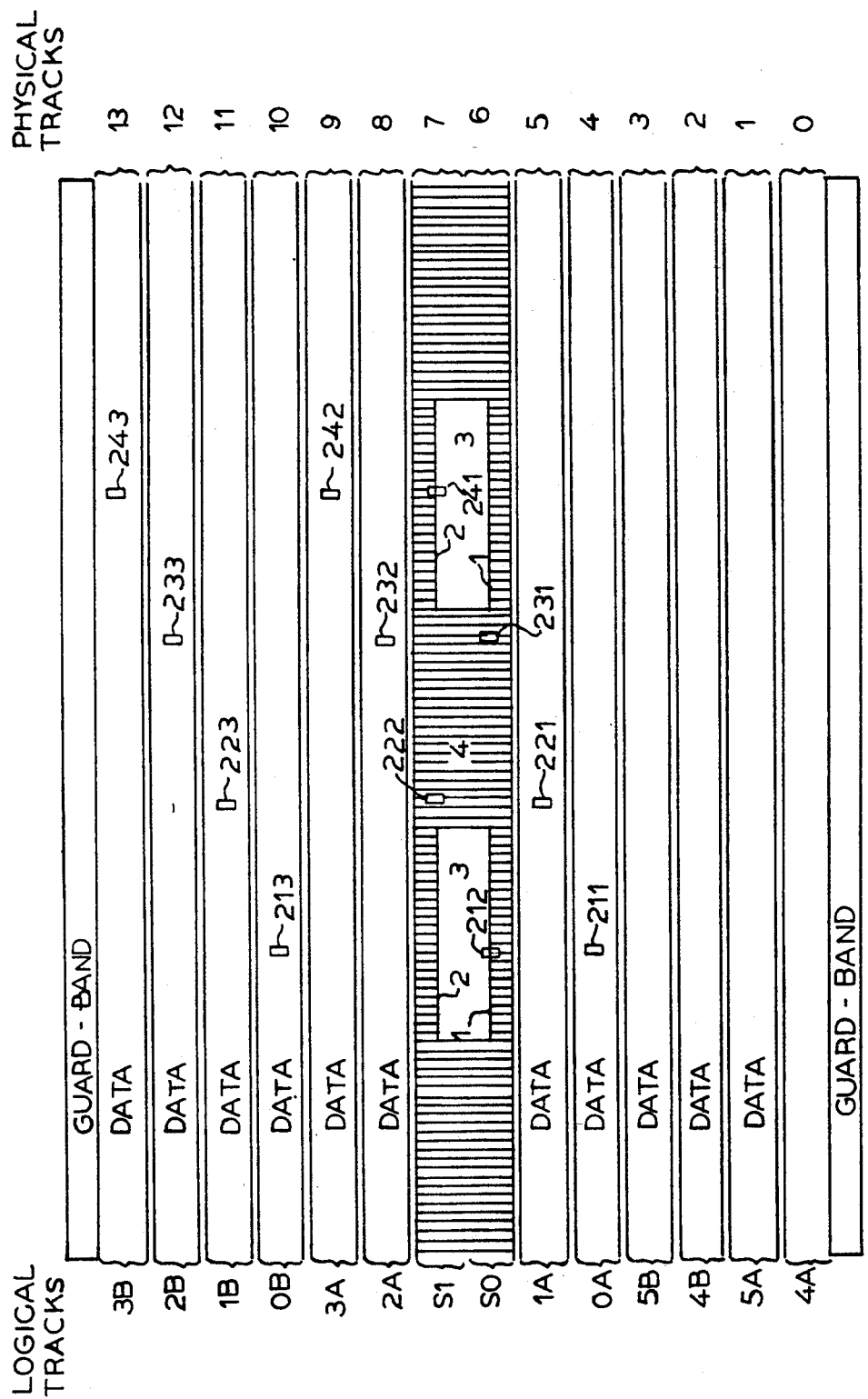
FIG. 17 is a diagram of a twelve data track tape format with two dedicated servo tracks.

FIG. 17 illustrates a twelve data track tape format with two dedicated servo tracks. It also indicates the linear operating range available.

In FIG. 17, the center position of servo track S0 is defined to be the lower edges 1 of the erased or non-recorded sections 3 in the constant wavelength pattern 4. Likewise, the center position for servo track S1 is shown at the upper edges 2 of the erased or non-recorded sections 3. During reading or writing on tracks 0A and 0B, the read gaps are located at positions 211, 212 and 213 as shown at the left erased or non-recorded section in FIG. 17.

When the tape is moved in an opposite direction, the read gaps are located at positions 221, 222 and 223. Therefore, when read channel 2 reads the servo tracks, logical tracks 0A, 0B, 1A and 1B can be read. Thereafter, read channel 1 is used for the servo, shown at read gap positions 231 and 241. During servo operation, samples are taken at the erased or non-recorded sections 3 and in between them to obtain the 100% reference level.

FIG. 17 shows a linear operating range for the servo as $+/-\frac{1}{2}$ read gap width. Since the read gap width is more narrow than the written track, i.e. the read gap width can vary from 55% to 70% of the written track, the first limitation will be clipping. However, when the gap is shifted outside the servo area, a more dangerous situation can exist. For example, if the read gap is shifted from its position 212 and moved downwards, the amplitude increases until clipping occurs. Moving the gap further downwards causes the gap to be partly outside the servo low-frequency pattern 4. Assuming that the servo read channel 2 has a bandpass filter centered at the frequency given by the tape speed and the wavelength of the recording pattern 4, only a limited amount of noise will be added when the servo read gap touches the nearest data track. Therefore, the sampled servo output decreases.

Figure 18:
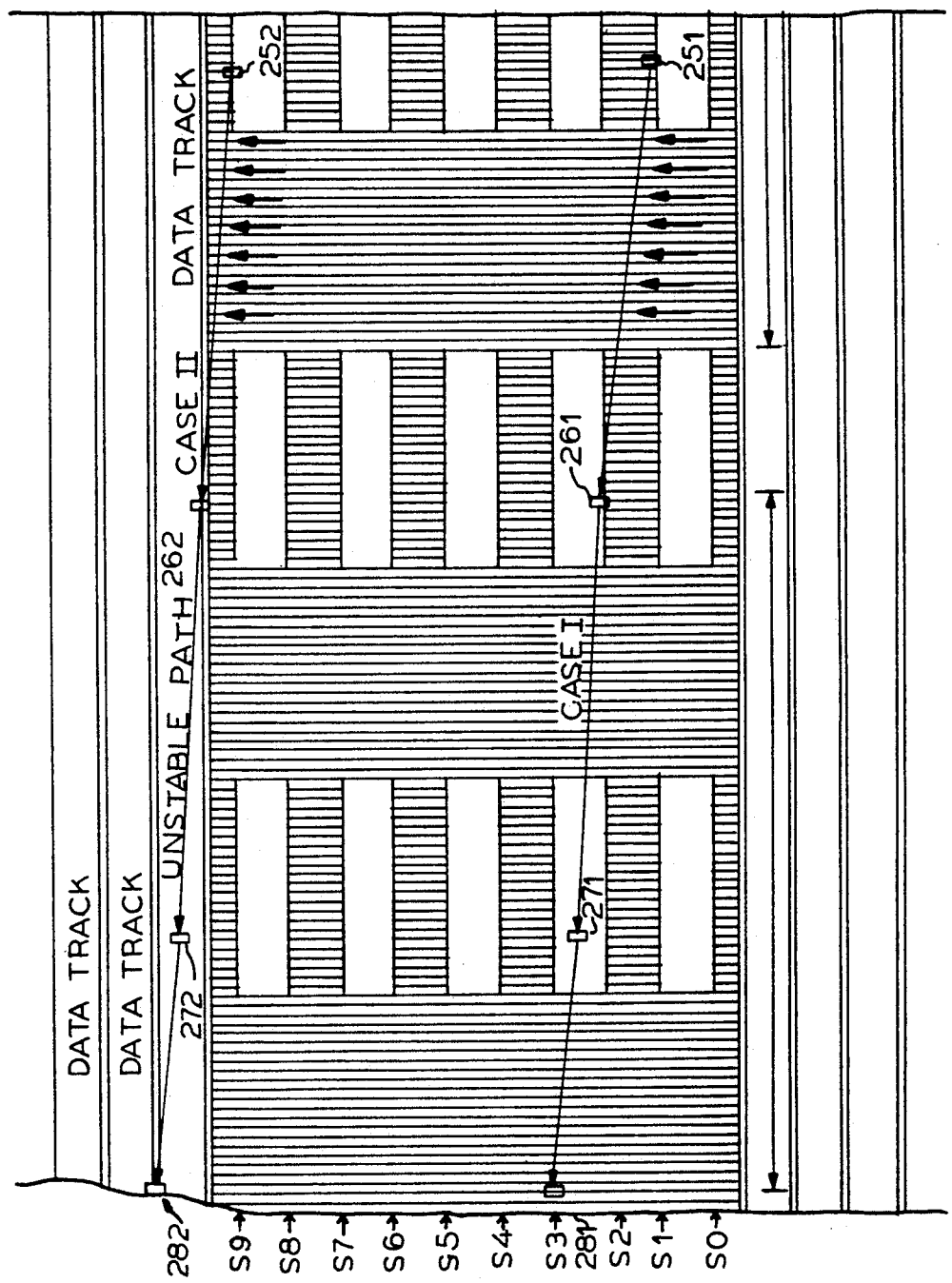
FIG. 18 is a diagram of ten dedicated servo tracks in paths of disturbed read head gaps.

FIG. 18 further illustrates this principle. Case I and Case II further illustrate this principle by showing what can happen when a disturbance in a vertical direction occurs.

In Case I, the read gap shall be on track S1. The read gap is forced from position 251 to position 261. At position 261, the sampled amplitude will be less than 50% of the level between samples, and since the system will "believe" the gap is on track S1, the gap is moved upwards to position 271 on the path and then further to position 281 where the head finally may lock on the wrong track S3.

Case II shows an example of an unstable path. Position 252 is the desired position. A reference sample is taken between position 252 and 262. If the sampled amplitude at position 262 is less than 50% of the sampled amplitude between positions 252 and 262, the read gap will be moved upwards resulting in an unpredictable path because both reference and servo samples will be noisy when taken on the data tracks or on unrecorded tape. The disturbance pulse shown in FIG. 18 is for illustration purposes only since a normal disturbance pulse is generally longer than what is shown.

For the proposed six GByte format, a total of 112 tracks can all be read by the same type of read gaps. Of these 112 tracks, 16 are dedicated servo tracks located in a servo band in the middle position of the tape. The servo tracks are of a special type: first, a continuous 16 pitch (or track) wide recording is made with a combined write/erase head followed by a subsequent erasure of eight sections in parallel, each section one pitch wide, similar to the five sections in FIG. 18.

The repetition rate of the erased or non-recorded parts is 10 kHz at 120 IPS (inches/second). Normal data read gaps are used for the servo; the zero point of the servo occurs when the center line through the read gap is located over one of the edges of the erased or non-recorded sections, i.e. when the servo output is 50% of the amplitude detected between the erased sections. The reference 100% servo amplitude level is automatically updated for each sample. The lower and upper edges of the eight erased or nonrecorded sections define the positions for 16 data tracks. Movement of the head up or down in response to a relative amplitude decrease is dependent on which of the edges the read gap follows.

The servo tracks can, therefore, be created with a special servo write head with a very wide write gap followed by an erase gap of the same width. Notches defining the portions between the erased sections can be placed with high accuracy ($+/-1$ μm, non-cumulative). All servo tracks can follow the transversal movements of the head relative to the tape when both servo band writing and erasure take place on the same paths. Therefore, the position of servo track 0 can be specified relative to the lower tape edge with an accuracy of only $+/-50$ μm, wherein all other servo and data tracks are specified with an accuracy of $+/-1$ μm relative to servo track 0. Read compatibility can, therefore, be achieved between the tape edge tracking servo system and the dedicated servo track system since the write/read sections of the heads can be made compatible for both systems. The tolerance of the location of the tracks is typically about $+/-1$ μm.

Read compatibility with tapes written using the dedicated servo method can be obtained since positions of the data tracks with respect to the lower tape edge are all correlated. If the data for the actual position of one servo track is known, the positions for all the other tracks is also known. Therefore, when a tape drive with the tape edge tracking servo system reads a tape recorded with a dedicated servo band format, a first sample of the position of one of the servo tracks is made, and the data is stored in memory. A new dynamic read table can then be created for each data track to be read based on the stored information of a single servo track.

Synchronizing signals can be contained at the start position of the servo tracks. These signals are then used to start the counting of servo samples along the tape length. Furthermore, each data track can contain a synchronizing signal at the same location as the servo synchronizing signals. Such a signal can, for example, be the first block marker.

The synchronization of the servo operation of the compatible drive is made to start/stop the synchronization at the holes punched in the tape marking data load point and the end of data area. The dedicated servo tape format does not contain reference bursts, unlike other QIC tape formats, prior to the holes indicating load point and end of data area holes. The data track preamble begins with a minimum distance of three inches and a maximum distance of four inches past the load point marker. The same specification is used when recording in a reverse direction when the end of data area marker is used to function as a load point marker.

Tape displacements at high vibrational frequencies are very small, typically estimated at a slew rate of up to 2 µm per ms. This is about 6% of the track pitch which is approximately equal to the track width for the proposed 10.5 GByte format. Maximum peak displacements are estimated at 5 µm. Furthermore, the vibrational noise which occurs is not random, but strongly related to certain characteristic frequencies of the cartridge itself or to the capstan wheel. The highest strong frequency generally lies in the range from 225 to 227 Hz with an average peak amplitude of 3.5 µm, with tape speed of 120 IPS. These frequency components of track variations can, therefore, be present in all tape drives, as well as in the positions of the dedicated servo tracks if these were recorded when the tape was placed in the cartridge. It is, therefore, possible to determine the servo bandwidth and sampling rate and the servo gain required at the critical frequency to follow the vibrations within a specified small error. However, the disturbance itself can be considered as a signal, and the necessary maximum bandwidth to store this signal spatially in memory is determined by the Nyquist criterion.

Assuming 1.5 times oversampling and a maximum frequency of 226 Hz, the number of stored data points necessary for a pass duration of 87.5 s (875 feet, 120 IPS) is: $226*2*1.5*87.5 = 59,325$.

The actual high frequency amplitude variations are small, approximately +/−5 µm. Therefore, only the deviations from the track center line need be stored. This center line can vary at +/−50 µm with respect to the reference tape edge, but this variation is of very low frequency, probably less than 1 Hz, although tape slippage may occur.

The rate of slippage is probably below 2 µm/ms since the mechanism physically involved is not high frequency vibrations, but a transition of the tape either up or down the tape rollers or tape guides. Therefore, delta modulation can be used to encode the positions of the tape edge. Using four bits for each sample and a resolution of 1 µm, a maximum deviation of +/−7 µm can be achieved from sample to sample. This allows data tracks to be followed with widths of approximately 34 µm and a read gap width of only 19.5 µm (the proposed 10.5 GByte QIC standard). Therefore, less than 30 kBytes of memory is required to store the data for the position of the servo track. The numbers referred to above, however, can vary with the type of cartridge used.

Figure 19:
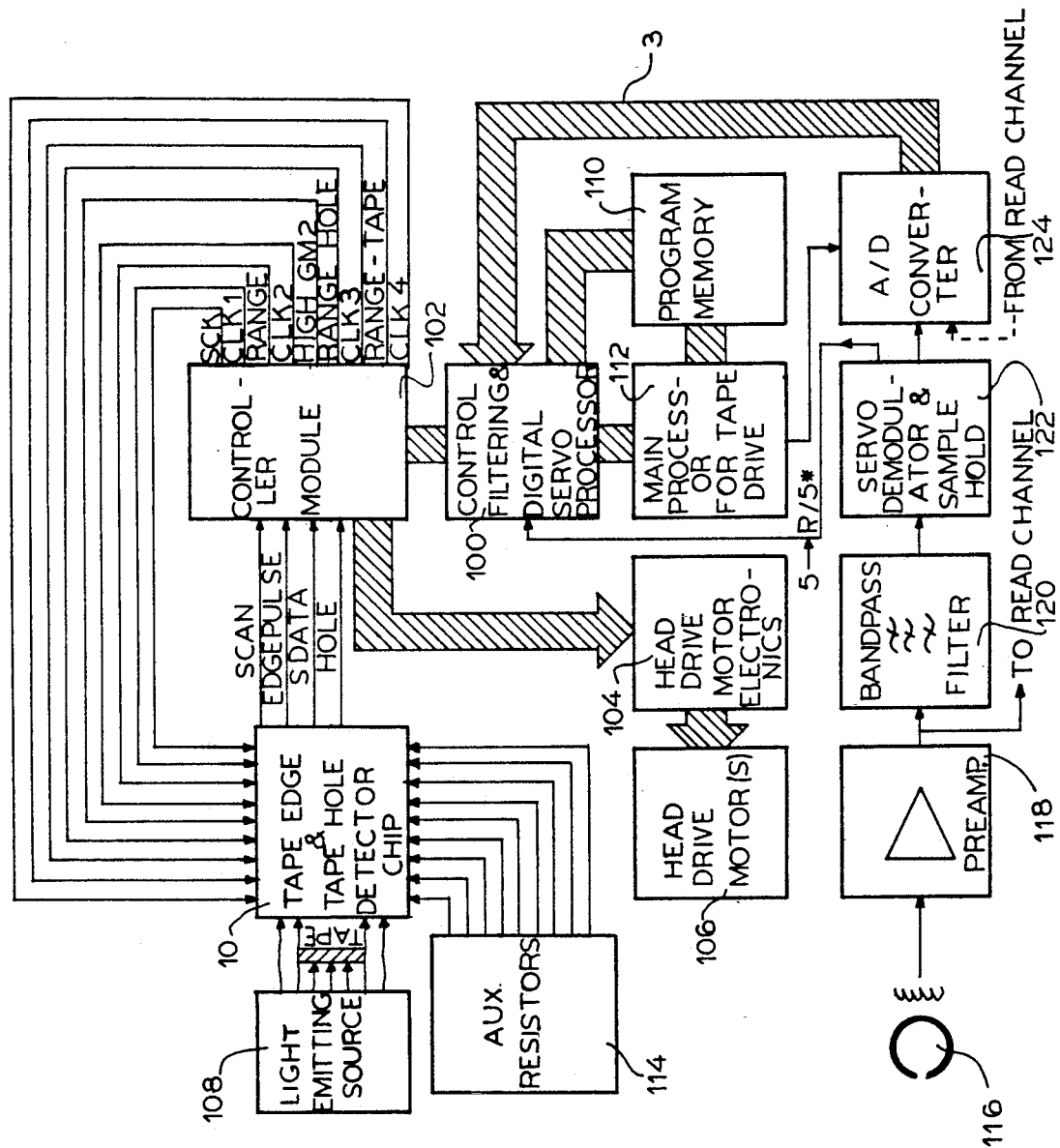
FIG. 19 is a block diagram of the control environment for the tape edge detector chip with the additional components required for servo control.

During reading of servo track 0, the tape edge detector tracking servo loop is broken, and the controller and processor monitor filter and store the position(s) of the tape edge(s) when the head is under servo control using inputs from a dedicated servo system as shown in FIG. 19.

Referring now to FIG. 19, a magnetic read head 116 is selected for the input to a servo channel comprising a bandpass filter 120, a servo demodulator and sample and hold circuit 122, and an analog-to-digital converter 124. The signal from the magnetic read head 116 is sent through a preamplifier 118 before being input to the servo channel.

The A/D converter 124 can be activated from the main processor 112 as shown in FIG. 19. The A/D converter 124 sends data to a control, filtering and digital servo processor 112 via the bus shown. A clock signal is also input to the A/D converter 124.

From the servo demodulator 122, a "reference-or-sample signal", R/S*, is sent to the servo processor 100. This ensures that the servo sample is divided by the reference level and not vice versa.

The A/D converter 124 in FIG. 19 can also be used for other purposes in the read channel, such as gain control, read channel adjustments, etc. Therefore, the only extra circuitry needed for compatibility is the bandpass filter 120 and servo demodulator and sample and hold circuits 122.

The read channel shown in FIG. 19 reads servo track 0 while the other read channels are idle. The active read channel contains one single servo detector dedicated to this channel. The sampled servo outputs and the sampled 100% reference levels which vary from time to time are all converted to digital form and sent to the control, filter and digital filter servo processor 100. The necessary division between the servo samples and the reference samples is performed, and the error signal is sent to the head drive motor electronics 104. The digitizing of the analog sampled servo information from the read channel allows the same digital filter and processor to be used as that used by the tape edge tracking servo. Furthermore, the digital filter approach facilitates changing of filter coefficients in the servo module, that is the physical mass of the magnetic recording head 116 can vary. Prior to storage of the position of the tape edge, the data is filtered according to the necessary bandwidth requirement to follow the critical disturbance frequencies of the tape cartridge. The phase information in the signal is preserved, and any extra delay relative to the tape transport synchronizing signal (10 kHz) must not be introduced. A digital finite impulse response filter (FIR) can obtain the desired response since the signal is not processed in real time. When the data is used as input to the servo during the subsequent read operations, auxiliary data points are inserted by an interpolator module (not shown) to avoid instabilities due to possible large step inputs to the servo reference input.

The method can be used for high-capacity tape drives using the tape edge tracking servo which is backwards read compatible with formats written using dedicated servo bands and tracks. Furthermore, backwards write compatibility or tape exchange compatibility can be obtained by using pre-formatted tapes containing the servo tracks only when the tapes need to be distributed to systems without the tape edge tracking servo system.

Although various minor changes and modifications might be proposed by those skilled in the art, it will be understood that I wish to include within the claims of the patent warranted hereon all such changes and modifications as reasonably come within my contribution to the art.

I claim as my invention:

1. An apparatus for controlling the position of a magnetic head relative to the detection of a servo track of a tape, said tape comprising a format with at least one dedicated servo track, said at least one dedicated servo track correlated with respect to an edge of said tape, comprising:
   a matrix of photodetectors in an integrated circuit chip disposed behind said tape wherein the position of each photodetector in said matrix is known from the manufacture of said chip and each photodetector generates an electrical signal corresponding to the intensity of light incident thereon;

illumination means for projecting light on said tape and said matrix so that said tape casts a shadow on said matrix wherein said shadow has a transition region at the tape edges from light to dark covering a plurality of photodetectors in said matrix;

analyzing means for processing signals from said photodetectors in said transition region to determine the location, relative to said known photodetector positions, of a sharpest light-to-dark transition wherein the location of a servo track of said tape is determined by the location of said sharpest light-to-dark transition; and positioning means responsive to the location of said servo track for positioning said head relative to said servo track of said tape.

2. The apparatus of claim 1 wherein said at least one servo track further comprises:

an erased or non-recorded portion at fixed intervals, each of said erased or non-recorded sections having an upper edge and a lower edge, which can be tracked via a servo demodulator and servo system.

3. The apparatus of claim 2 wherein said positioning means is responsive to one of said edges of said erased or non-recorded section for positioning said head relative to one of said edges.

4. The apparatus of claim 1 further comprising:

a memory for storing position information relative to a tape edge of one of said dedicated servo tracks.

5. The apparatus of claim 4 further comprising:

a read table for storing position information relative to a tape edge of each data track of said tape based on said information stored for said single servo track.

6. The apparatus of claim 1 wherein said tape further comprises:

designations for synchronizing counting of servo samples along the length of said tape.

7. The apparatus of claim 1 wherein said magnetic head comprises three channels.

8. The apparatus of claim 1 wherein said magnetic tape comprises 112 tracks of which 16 are dedicated servo tracks.

9. The apparatus of claim 2 wherein said each of said erased or non-recorded sections is 10 kHz when the tape speed is 120 inches per second.

10. A method for controlling the position of a magnetic head relative to the detection of a servo track of a tape, said tape comprising a format with at least one dedicated servo track, said at least one servo track correlated with respect to an edge of said tape, comprising:

disposing said tape in front of a matrix of photodetectors in an integrated circuit chip, the position of each photodetector in said matrix being known from the manufacture of said chip, wherein each photodetector generates an electrical signal corresponding to the intensity of light incident thereon;

illuminating said tape and said matrix so that said tape casts a shadow on said matrix, said shadow having a transition region at the tape edges from light to dark covering a plurality of photodetectors in said matrix;

analyzing the signals from said photodetectors in said transition region to determine the location, relative to said known photodetector positions, of a sharpest light-to-dark transition;

using the location of said sharpest light-to-dark transition as the location of a servo track of said tape; and positioning said magnetic head relative to said servo track of said tape.

11. The method of claim 10 wherein said analyzing step further comprises:

detecting an erased or non-recorded section of each of said servo tracks, said erased or non-recorded section recurring at fixed intervals and each said erased or non-recorded section having an upper edge and a lower edge wherein a light-to-dark transition equal to one-half of said sharpest light-to-dark transition can be detected at each of said edges.

12. The method of claim 10 wherein said positioning step further comprises the step of:

positioning said head relative to one of said edges of one of said erased or non-recorded sections.

13. The method of claim 10 further comprising the step of:

storing position information relative to a tape edge of one of said dedicated servo tracks.

14. The method of claim 13 further comprising the step of:

storing position information relative to a tape edge of each data track of said tape based on said information stored for said single servo track.

15. The method of claim 10 further comprising the step of:

synchronizing counting of servo samples along the length of said tape.

16. The method of claim 11 further comprising the step of:

repeating each of said erase sections at a rate of 10 kHz, when the tape speed is 120 inches per second.

17. The method of claim 10 further comprising the step of:

dedicating 16 servo tracks for said tape, wherein said tape comprises 112 tracks.

18. The method of claim 10 further comprising the step of:

providing said magnetic head with three channels.

19. The method of claim 15 further comprising the step of:

beginning or ending said synchronizing at holes designated in said tape marking data load point or end of data area.

* * * * *